(12) United States Patent
Leseur

(10) Patent No.: US 9,229,127 B2
(45) Date of Patent: Jan. 5, 2016

(54) METHODS PROGRAM CODE, COMPUTER READABLE MEDIA, AND APPARATUS FOR PREDICTING MATRIX PERMEABILITY BY OPTIMIZATION AND VARIANCE CORRECTION OF K-NEAREST NEIGHBORS

(71) Applicant: Saudi Arabian Oil Company, Dhahran (SA)

(72) Inventor: Nicolas Leseur, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 564 days.

(21) Appl. No.: 13/773,231

(22) Filed: Feb. 21, 2013

(65) Prior Publication Data
US 2014/0236486 A1 Aug. 21, 2014

(51) Int. Cl.
G06F 17/18 (2006.01)
G01V 9/00 (2006.01)
G01V 1/50 (2006.01)
G01V 99/00 (2009.01)

(52) U.S. Cl.
CPC .. *G01V 9/00* (2013.01); *G01V 1/50* (2013.01); *G01V 99/00* (2013.01); *G01V 2210/6246* (2013.01)

(58) Field of Classification Search
CPC ......... E21B 43/00; E21B 49/00; G01V 11/00; G01V 2210/612; G01V 1/50; G01V 2210/6246; G01V 99/00; G01V 9/00; G06Q 10/06

USPC .......... 702/6, 9, 11, 13; 703/6, 10; 706/20, 21
See application file for complete search history.

(56) References Cited

U.S. PATENT DOCUMENTS

| 4,646,240 A | 2/1987 | Serra |
|---|---|---|
| 5,251,286 A | 10/1993 | Wiener |

(Continued)

FOREIGN PATENT DOCUMENTS

| CA | 2262386 C | 12/2005 |
|---|---|---|
| WO | 0131366 A1 | 5/2001 |
| WO | 2009032220 A1 | 3/2009 |

OTHER PUBLICATIONS

Greder et al. "Petrophysical Logs on Cores: A New Tool for Core-Log Calibration and Reservoir Characterization" SPWLA 35th Annual Logging Symposium, Jun. 19-22, 1994, 24 pages, XP002730196.

(Continued)

*Primary Examiner* — John H Le
(74) *Attorney, Agent, or Firm* — Bracewell & Giuliani LLP; Constance Rhebergen; Christopher L. Drymalla

(57) ABSTRACT

Methods, program code, computer readable medium, and apparatus estimating permeability at unsampled (uncored) but logged interval locations in a reservoir based upon a similarity with log signatures from cored intervals, are provided. An example of a method can include performing a core plug-by-core plug blind test, defining an objective function which qualifies the quality of the permeability prediction to minimize discrepancies between measured and predicted permeability, optimizing calculated parameters, and estimating permeability values of uncored logged intervals. The method can also include applying a debiasing/variance restoration to compensate for inherent averaging artifacts.

36 Claims, 7 Drawing Sheets

(56) References Cited

U.S. PATENT DOCUMENTS

| | | | |
|---|---|---|---|
| 5,444,619 A | 8/1995 | Hoskins | |
| 5,798,982 A | 8/1998 | He | |
| 6,018,497 A | 1/2000 | Gunasekera | |
| 6,088,656 A | 7/2000 | Ramakrishnan | |
| 6,295,504 B1 | 9/2001 | Ye | |
| 6,477,469 B2 | 11/2002 | Ye | |
| 6,847,895 B2 | 1/2005 | Nivlet | |
| 7,043,410 B2 | 5/2006 | Malthe-Sorenssen | |
| 7,277,796 B2 | 10/2007 | Kuchuk | |
| 7,873,476 B2 | 1/2011 | Thorne | |
| 7,953,585 B2 * | 5/2011 | Gurpinar | E21B 43/00 166/250.16 |
| 8,065,086 B2 | 11/2011 | Yu | |
| 8,126,647 B2 | 2/2012 | Hruska | |
| 2009/0030614 A1 | 1/2009 | Carnegie | |
| 2009/0259446 A1 | 10/2009 | Zhang | |
| 2010/0094557 A1 | 4/2010 | Yu | |
| 2010/0211536 A1 | 8/2010 | Al-Fattah | |
| 2010/0326669 A1 | 12/2010 | Zhu | |
| 2011/0118983 A1 | 5/2011 | Rowan | |
| 2012/0065888 A1 | 3/2012 | Wu | |
| 2012/0221306 A1 | 8/2012 | Hurley | |
| 2012/0253770 A1 | 10/2012 | Stern | |

OTHER PUBLICATIONS

International Search Report and Written Opinion, PCT/US2014/016271, dated Nov. 13, 2014.

Rabiller et al. "The Iterative Use of Clustering and Modeling to Improve Permeability Prediction" SPWLA 42nd Annual Logging Symposium, Jun. 17-20, 2001, 14 pages, XP002730195.

* cited by examiner

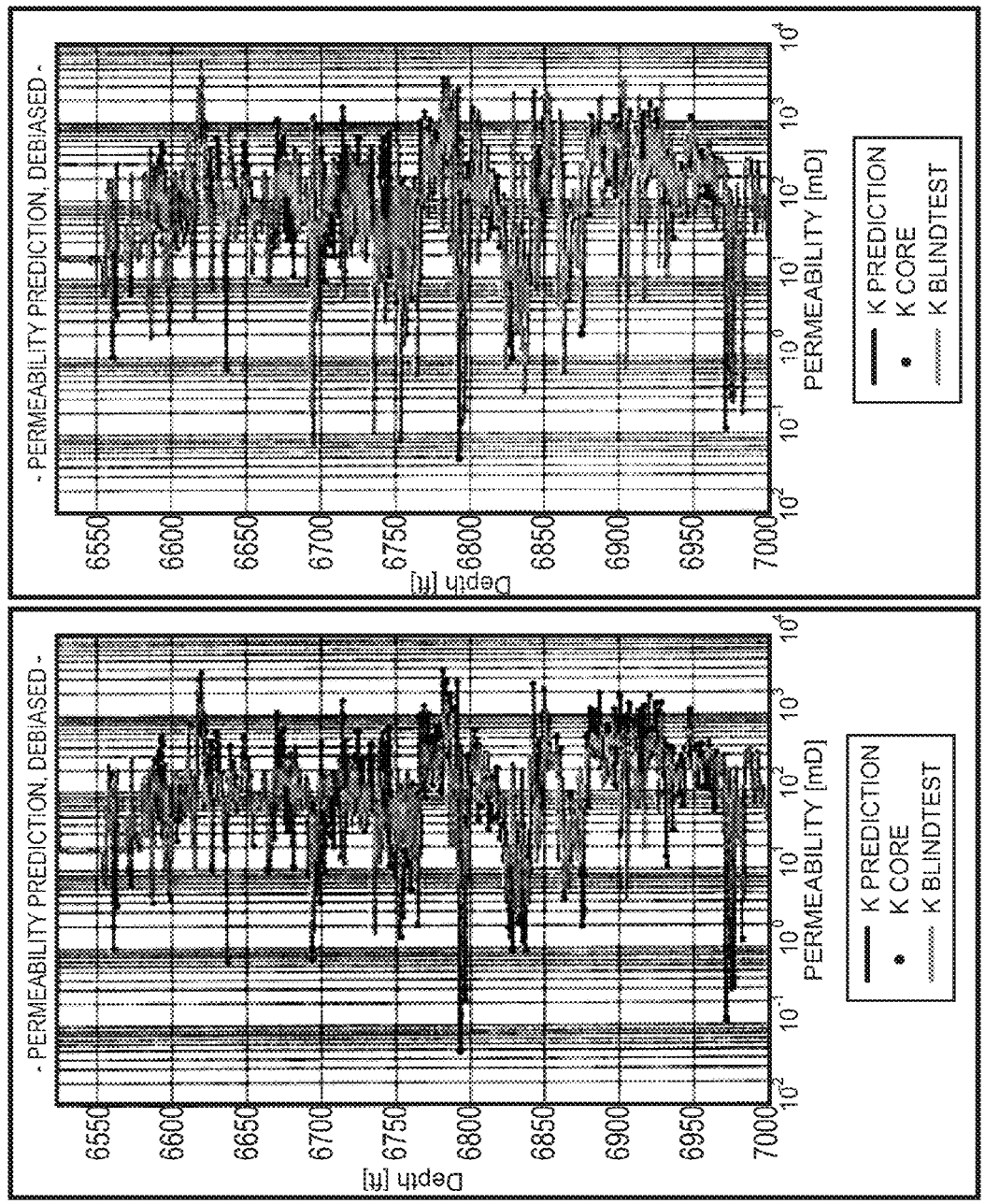

METHODS PROGRAM CODE, COMPUTER READABLE MEDIA, AND APPARATUS FOR PREDICTING MATRIX PERMEABILITY BY OPTIMIZATION AND VARIANCE CORRECTION OF K-NEAREST NEIGHBORS

BACKGROUND OF THE INVENTION

1. Field of the Invention

This invention relates in general to hydrocarbon production, and more particularly to methods, computer readable medium, apparatus, and program code, for estimating or otherwise determining permeability at unsampled, uncored but logged interval locations in a reservoir.

2. Description of the Related Art

Permeability is essential for calculating saturation height functions, building a three-dimensional model of the reservoir, and for forecasting field performance. In a typical oil or gas field, all boreholes are "logged" using electrical tools to measure petrophysical parameters such as porosity and density. A sample of these are cored, with the cored material used to measure permeability directly. Coring, however, is expensive and time consuming in comparison to the electric survey techniques most commonly used to gain information about permeability. A challenge to industry is, therefore, to accurately predict permeability in all bore holes by inference from the routinely logged electrical surveys and the more limited core information.

In principle, determining permeability from electrical measurements is a matter of solving equations in rock physics. In practice, there are numerous complicating factors that make a direct functional relationship difficult or impossible to determine. One problem is that permeability is related to the aperture of pore throats between rock grains, which logging tools do not directly measure. Even in the laboratory it is difficult to relate a log response to a physical parameter. Several parameters such as mineralogy, reservoir fluids, and drilling fluid invasion can influence the permeability measurement. Determining permeability from well logs is further complicated by the problem of scale: well logs typically have a vertical resolution of two feet compared to two inches in core plugs. Additionally, there are measurement errors on both the logs and core.

Traditionally permeability prediction has involved an integration of core and well log data. Core data from laboratory measured porosity and permeability are used in a regression analysis to derive a relationship between these two measurements. The relationship is then applied to well log porosity to derive permeability.

There are several limitations to this technique. For example, in carbonate reservoirs these simple relationships are often not valid because the permeability is not only a function of porosity but of several different parameters. Reservoirs such as those in the Middle East, for example, typically show a large porosity/permeability scatter. Correlations between permeability and porosity are generally poor and large variations of permeability values within a small porosity range are typical. A regression line on this data simply does not account for the large uncertainties in permeability prediction.

In addition, regression analyses introduce errors by averaging data that may not represent the reservoir permeability. That is, as a result of the data being averaged (i.e., smoothed), the high and the low permeability zones that have a great impact on the fluid flow are under-represented, and thus, the full effects of these "highways and barriers" are not incorporated into the simulation models. Additionally, permeability is not simply a function of porosity: many factors related to the depositional and diagenetic environment conditions play a role.

Several authors have proposed methods based on statistics, neural networks, and clustering in order to build predictive models. In formations with strong heterogeneity such as those having thinly laminated sands and shale, however, such methods would be expected to overestimate the minimum permeability, underestimate the maximum permeability, and make discrete, multi-modal permeability appear as a broadly unimodal property. P. Rabiller (2001).

Although generally well-suited to problems involving complex relationships, in the case of Neural Networks, it is very difficult to determine how the net is making its decision. Consequently, it is hard to determine which features are important and useful for the classification, and which are worthless. Neural Networks algorithm requires multiple variables which most of the times cannot be set up by the user—i.e., initialization of the neural network, learning function, weighting function, iteration time. This is why it is generally considered to be a black box.

Cluster analysis seeks to overcome the limitations of prior methods by simultaneous incorporation of all of petrophysical attributes to determine permeability. In this type of analysis, log signatures are used to derive permeability and lithology by training data to laboratory measured core values, and through visual core descriptions, if available. The K-nearest neighbor (KNN) algorithm provides an analysis, which in contrast to the neural network black-box, can inform the user of which variable is the most important in the prediction due to the straightforward linear mapping. On the other hand, one of the most serious shortcomings of KNN is that the method is very sensitive to the presence of irrelevant parameters. Adding a single parameter that has a random value for all objects in which it is unable to separate the classes, can cause this method to underperform significantly.

Conventional software using KNN as the core engine for permeability prediction suffers from several drawbacks. These drawbacks include: arbitrary user inputs for the number of nearest neighbors, weights applied to the well log data, the normalization parameter $P_k$, distance power parameter $\beta$ or those based on impure coal and loose criteria; a requirement of performing manual and time-consuming sensitivity analysis; and a manual and time-consuming well-by-well blind test. Current practice of permeability prediction using KNN allows only limited and manual cross-validation procedures. It is often done on a well-by-well basis, manually and on only on a few key wells.

Additional drawbacks include utilization of unclear quality control criteria or objective function, and unclear estimation of the prediction error. In the absence of clear quantitative target, the current interpretation and validation of the results remains very heuristic. Current use of KNN based permeability prediction suffers from traditional averaging artifacts. Highs values of permeability are underestimated and low values are overestimated.

Recognized, therefore, by the inventor is the need for methods, program code, computer readable media, and apparatus that can combine the existing KNN algorithm with a constrained nonlinear optimization algorithm. There are no current methods suggesting the use of an optimization algorithm to find the optimum inputs to the KNN based prediction, or ones which can improve on the conventional approach by finding the KNN prediction parameters leading to the best prediction with no human bias. Recognized also is the need for methods, program code, computer readable media, and apparatus that can define a clear objective function to minimize discrepancies between measured and predicted permeability and optimize all user inputs. Further, recognized is the need for methods, program code, computer readable media, and apparatus that can integrate a smoothing correction procedure to compensate for KNN inherent averaging artifacts.

SUMMARY OF THE INVENTION

In view of the foregoing, various embodiments of the present invention provide methods, program code, computer readable media, and apparatus that can combine the existing KNN algorithm with a constrained nonlinear optimization algorithm to provide an ability to find the KNN prediction parameters leading to the best prediction with no human bias. Various embodiments provide methods, program code, computer readable media, and apparatus that can define a clear objective function to minimize discrepancies between measured and predicted permeability and optimize all user inputs, and which quantifies the quality of the prediction. Various embodiments provide methods, program code, computer readable media, and apparatus which can perform an automated sensitivity analysis. Advantageously, impact of each input variable on the output results can advantageously be used in the optimization algorithm calculations. Further, the optimization calculations can employ an automated core plug-by-core plug blind test, which is statistically more representative of the final prediction robustness than the current industry standard. Advantageously, what were previously arbitrary parameters can be adjusted so that the final prediction approaches as close as possible to the target core data. Still further, various embodiments provide methods, program code, computer readable media, and apparatus that can integrate a smoothing correction procedure which provides debiasing/variance restoration to compensate for KNN inherent averaging artifacts, while honoring global averages. Because reservoir flow is mostly controlled by permeability contrasts, this process can better reproduce the rock heterogeneity.

An example of a computer-assisted method for estimating permeability at unsampled but logged interval locations in a reservoir, can include the steps of: providing a database including one or more databases or lookup tables containing one or more data sets of measured well log values of a plurality of reservoir properties to include porosity and a corresponding one or more data sets of measured core values of the plurality of reservoir properties for a plurality of core samples extracted from a plurality of core sample locations in a reservoir; filtering the database based on a level of a statistical match between measured core porosity and computed log porosity to remove unphysical extreme data to thereby form a reference database; and normalizing each of the plurality of properties at each of the plurality of core sample locations in the filtered database using an initial value of a normalization parameter, when a filtered and/or normalized database is not otherwise provided.

According to an exemplary configuration, the step of filtering can include removing collocated log and core data having large porosity discrepancies exceeding a certain level of difference between log and core porosity so that the two respective data types are coherent with each other, and performing a graphical comparison of a permeability histogram for a raw unfiltered form of the reference database with permeability histogram for the filtered form of the reference database to thereby quantify the amount of data removed during the filtering as a quality control measure to ensure that the filtering did not excessively impact the overall permeability distribution (i.e., no critical loss of information due to data removal).

The method can also include the steps of: selecting initial values of weights for each of a plurality of reservoir properties, an initial value of a distance power parameter, and the initial value of a normalization parameter when respective default values are not assigned or to be utilized; performing an optimization procedure; and performing a deterministic permeability prediction workflow utilizing optimized values of the weights for the plurality of reservoir properties, an optimized value of the distance power parameter, and an optimized value of the normalization parameter to calculate permeability at a query point or an unsampled but logged interval location encompassing the query point.

According to an exemplary configuration, the optimization procedure can include: performing a blind test procedure to determining an absolute average residual value of a difference between the estimated permeability and known permeability for the plurality of core samples; changing the values of one or more of the weights of the plurality of reservoir properties, the value of the distance power parameter, and the value of the normalization parameter; and repeating the step of performing the blind test procedure utilizing the changed values and changing the values of one or more of the weights of the plurality of reservoir properties, the value of the distance power parameter, and the value of the normalization parameter until local minimum of the absolute average residual value is reached to thereby determine the optimized values of the weights for the plurality of reservoir properties, and optimized value of the distance power parameter, and the optimized value of the normalization parameter for use in determining the permeability at a query point or an unsampled but logged interval location encompassing the query point.

According to an exemplary configuration, the blind test procedure can include: removing one of the plurality of core samples from the filtered database to thereby create a new database which does not include the removed core sample; estimating permeability for the removed core sample according to the deterministic permeability prediction workflow; calculating an absolute value of the difference between the estimated permeability and known permeability of the removed core sample; calculating a ratio between the known permeability and the estimated permeability for the removed sample core; repeating the steps of removing of one of the core samples, estimating permeability, and calculating an absolute value for each other of the plurality of core samples from the filtered database; and determining an absolute average residual value of a difference between the estimated permeability and known permeability for the plurality of core samples.

The step of estimating permeability for the removed core sample according to the deterministic permeability prediction workflow can include: determining a distance between the core sample location of the removed core sample and the core sample location of each other of the plurality of core samples in the new database, with each respective distance based upon a weighted difference between a well log property value of one of the reservoir properties at the core sample location of the removed core sample and a core sample property value of the one of the plurality of reservoir properties of one of the other of the plurality of core samples being calculated for each separate one of the plurality of reservoir properties. The step of estimating permeability for the removed core sample can also include: ranking the plurality of core samples based upon the determined distances; determining a heuristically optimal number K (or NN) of nearest neighbors responsive to a sensitivity analysis, or selecting a sufficiently large number of nearest neighbors (e.g., 30) when a respective default value is not assigned or to be utilized; and calculating the estimated permeability of the removed core sample based upon a weighted geometric average of the permeability of each identified K-nearest neighbors and corresponding determined distance between the core sample location of the removed core sample and the respective core sample location of each optimal or selected K nearest neighbors.

The deterministic permeability prediction workflow can include the step of determining a distance between a query point or location interval and the core sample location of each of the plurality of core samples in the reference database, with each respective distance based upon a weighted difference between a well log property value of one of the reservoir properties at the query point or location interval and a sampled core property value of the one of the plurality of reservoir properties of one of the plurality of core samples, being calculated for each separate one of the plurality of reservoir properties. The workflow can also include the steps of ranking the plurality of core samples based upon the determined distances, determining a heuristically optimal number K (or NN) of nearest neighbors responsive to a sensitivity analysis or selecting a sufficiently large number of K nearest neighbors (e.g., 30), and calculating a distance weighted average permeability at the query point based upon the permeability of the identified number of K nearest neighbors.

The method can also include the step of performing a variance correction procedure. The variance correction procedure can include calculating a ratio between measured permeability and predicted permeability for each of the plurality of sampled cores identified as nearest neighbors to a query point or location interval, and calculating a distance weighted average permeability at the query point or location interval based upon the measured permeability of each of a plurality of identified nearest neighbors and the calculated ratio between the measured permeability and the predicted permeability of each of the plurality of identified nearest neighbors.

An example of a computer readable medium for estimating permeability at unsampled but logged interval locations in a reservoir, can embody instructions that when executed by one or more processors and/or a computer, cause the computer to perform operations comprising the computer implementable steps, described above.

An example of an apparatus for estimating permeability at unsampled but logged interval locations in a reservoir, can include a permeability analyzing computer including a processor and memory coupled to the processor, and permeability analyzing program code adapted to cause the permeability analyzing computer to estimating permeability at unsampled but logged interval locations in a reservoir, the program code stored in the memory of the permeability analyzing computer and including instructions that when executed by the permeability analyzing computer, cause the computer to perform the operations comprising the computer implementable steps, described above.

Various embodiments of the present invention advantageously provide optimization of a modified KNN using a constrained nonlinear optimization algorithm. The objective function of the optimization algorithm can be based on a core plug-by-core plug blind test, contrary to conventional wisdom. According to one or more embodiments, additional parameters ($w_i$, $\beta$) are introduced which add greater flexibility to the standard KNN algorithm. Additionally, where the industry considers the results of the regular KNN algorithm to be the final and definitive result, various embodiments advantageously provide a post-processing adjustment of the regular KNN algorithm with a simple and functional variance correction procedure to closely restore the reference data. According to various embodiments, the objective function is based on core plug-by-core plug blind test procedure used to adjust the KNN algorithm parameters, where the industry standard is a well-by-well manual blind test, which is statistically a biased approach and a time consuming task to perform. Modification of the standard KNN enables to better reproduce reference data heterogeneity, and provides more flexibility to the existing practice.

According to various embodiments, the enhanced methodology provides not only mathematical manipulation, but rather a complete workflow with quality assurance, quality control, pre-processing steps and, post-processing steps on the top of the optimized modified KNN algorithm. A main philosophy of this prediction methodology is to estimate an uncored but logged interval based on its similarity with other log signatures from cored intervals. The different degrees of similarity with other cored intervals set the weights for an averaging of the latter intervals where permeabilities were measured. Furthermore, various embodiments advantageously employ a combination of an optimization algorithm with a novel cross-validation technique (core plug-by-core plug blind test), absent in conventional methodologies. Where current industry practice focuses on the optimization of the number of nearest neighbors, K (or NN as described later), the methodology employed according to various embodiments advantageously enable the optimization of other numerical parameters of a modified KNN algorithm, using, for example, a nonlinear optimization algorithm, which gives more flexibility than existing commercial packages. Finally, where conventional quality assurance and quality control methodologies are manual and do not integrate into a single feedback loop, various embodiments are advantageously designed such that they can be practically automated in one seamless feedback loop program.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 4 is a graph illustrating the results of smoothing artifacts on a blind test curve illustrating estimated permeability of a reservoir according to an embodiment of the present invention.

FIG. 5 is a graph illustrating a variance corrected version of the blind test curve of FIG. 4 showing wider ranges of permeability variation being closer to the core data values and frequency, according to an embodiment of the present invention;

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

Permeability estimates at unsampled (uncored) locations are essential for calculating saturation height functions, building a three-dimensional model of the reservoir, and for forecasting field performance. Accordingly, various embodiments of the present invention provide a methodology of estimating parameters of an uncored but logged interval based on its similarity with other log signatures from cored intervals. The different degrees of similarity with other cored intervals set the weights for an averaging of the latter intervals where permeabilities were measured. As an input to a myriad of petrophysical and reservoir engineering workflows, a better quality in permeability prediction has a direct impact on rock typing, oil in place, recovery factor, history match and prediction forecast.

The methodology according to one or more embodiments is based on a modified K-Nearest Neighbors (KNN) algorithm and the use of database lookup tables, which brings a substantial improvement to existing KNN technology. The methodology advances existing technology to the next level through robust quality assurance and quality control procedures, which include a blind test based on user input optimization and/or a reproduction of variance of target core data while honoring the global average. What are traditionally arbitrary parameters are adjusted so that the final prediction is at or near as close as possible to the target core data. Because reservoir flow is mostly controlled by permeability contrasts, the reproduction of variance of the target core data can provide an improved representation of the rock heterogeneity.

The methodology according to various embodiments of the invention enables both optimization and automation of multiple tasks, which would not be feasible within the regular time frame of a formation evaluation study. Furthermore, innovative methods like sample-by-sample blind tests and a variance correction procedures add and complement the value of previous optimization and automation improvements. According to a real world application, the methodology according to various embodiments has practically shown improvements in the reservoir simulation of mature reservoirs where the use of arbitrary permeability multipliers was reduced as a result of a more faithful estimation of the reservoir permeability heterogeneity.

Figure 7:
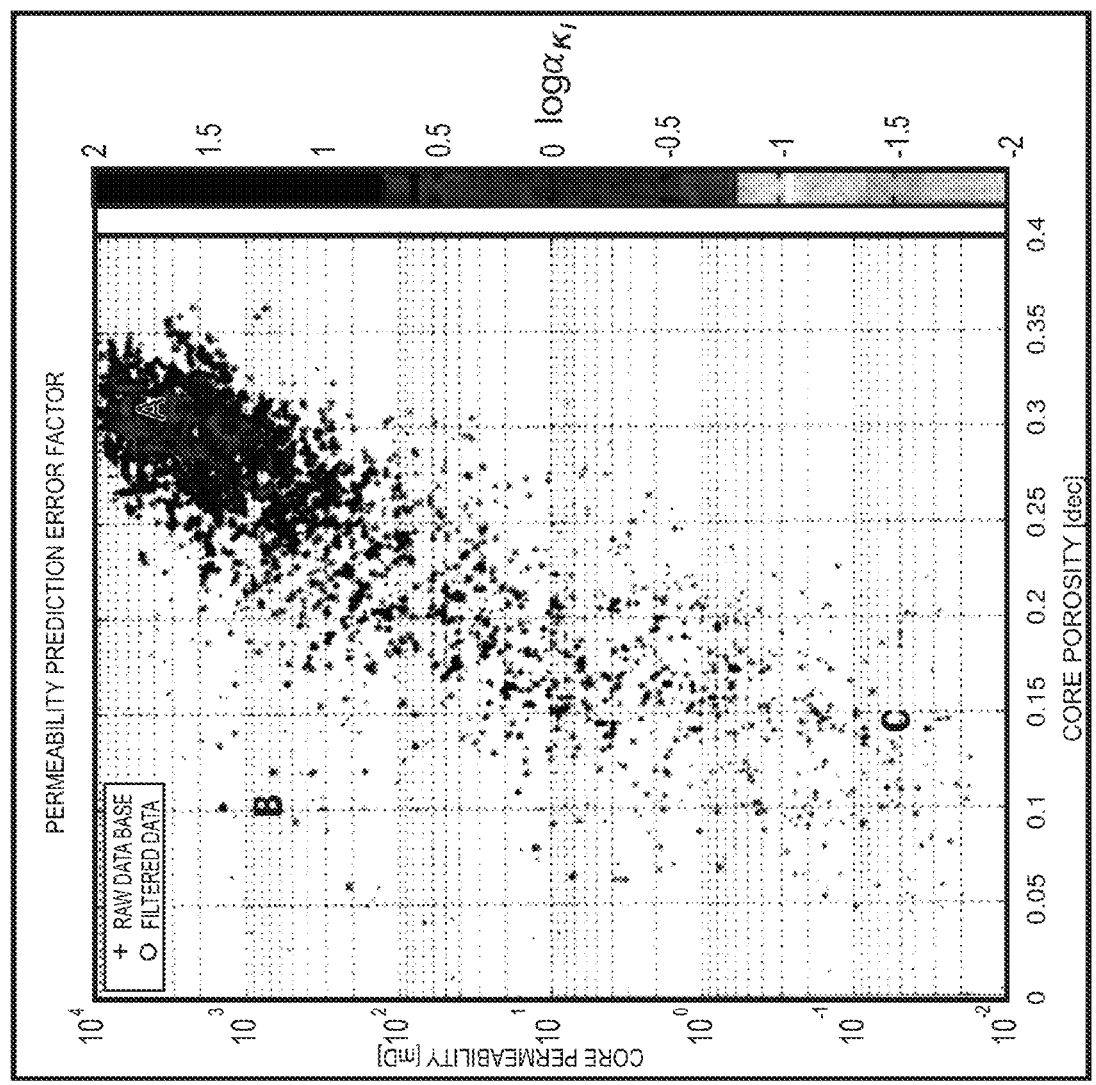
FIG. 7 is a graph illustrating a permeability porosity crossplot color painted with log log $\alpha_k$ for a clastic reservoir according to an embodiment of the present invention.

According to one or more embodiments, the improvements to existing KNN technology can include a filtering pre-processing based on the discrepancy between log and core porosity leads to a better prediction (Eqs. 1-3, below). Input parameters traditionally arbitrarily fixed by the user are now optimized through a constrained nonlinear optimization algorithm. The individual weight of every input property influencing the output KNN-based permeability prediction type is optimized (Eq. 5, below). Residuals from a blind test on a one by one sample basis, as described in the line test procedure (BTP), is defined as the most effective and least biased objective function to minimize (Eq. 7, below). The latter objective function sets the basis for measurable and easy-to-interpret quality criteria and quality control of the permeability prediction. The method can, if desired, automatically match the core data at the core data location. High and low permeabilities are better honored than by the standard KNN approach through a simple variance correction procedure Eqs. 8-9, below). This step also helps to reduce if not eliminate the use of arbitrary permeability multipliers at the reservoir simulation step. The implementation of the algorithm can be easily achieved so that these steps and the standard KNN procedure are fully automated. Through automation and optimization, the methodology delivers faster and higher quality results than the current KNN based techniques. Additional quality checks can aid in identifying bad quality log interval and/or core samples and target zones for permeability sample acquisition (FIG. 7).

Database Filtering Procedure (DBFP)

According to the exemplary configuration, a filtering process is provided to remove collocated log and core data which show large porosity discrepancies. It is based on the standard deviation of the difference between core and log porosities (porosity definitions from the two data type have to be coherent with each other).

$$R_\varphi = |\varphi_{core} - \varphi_{log}| \quad (1)$$

$$\sigma_{R_\varphi} = \left(\frac{1}{N}\sum_{i=1}^{N}(R_{\varphi_i} - \overline{R_\varphi})^2\right)^{\frac{1}{2}} \quad (2)$$

$$\text{with } \overline{R_\varphi} = \frac{1}{N}\sum_{i=1}^{N}R_{\varphi_i} \quad (3)$$

where:
Rφ is the absolute porosity residual between the core and log data,
$\varphi_{core}$ is the overburden core porosity,
$\varphi_{log}$ is the porosity from a logging tool,
$\sigma_{R\varphi}$ is the standard deviation of the absolute porosity residual Rφ,
N is the number of core data in the reference database, and
$\overline{R_\varphi}$ is the average absolute porosity residual.
If Rφ<$\sigma_{R\varphi}$, the data can be used to build the new and valid subset of the reference database.

This filtering step basically aims at removing a certain amount of data regarded as outliers (from a Gaussian perspective). It positively impacts the prediction quality by creating better correlation between the log and the core properties, which is a typical source of intrinsic noise and misleading information for machine learning algorithms. From a petrophysical perspective, these core-to-log miscorrelation issues can exist due to poor core depth matching, inappropriate core sample preparation in the lab, chemical properties of the mud, and logging tool resolution, etc.

The DBFP procedure can be seen as a global filtering to overcome unphysical core to log association. On the other hand it is important to include as many core samples as possible so as to reproduce the reservoir heterogeneity and prevent smoothing artifacts. The optimum compromise between filtering unphysical extreme data and including representative outliers can be achieved through a sensitivity analysis as would be understood by one of ordinary skill in the art.

Data loss Quality Control (QC)

Figure 1:
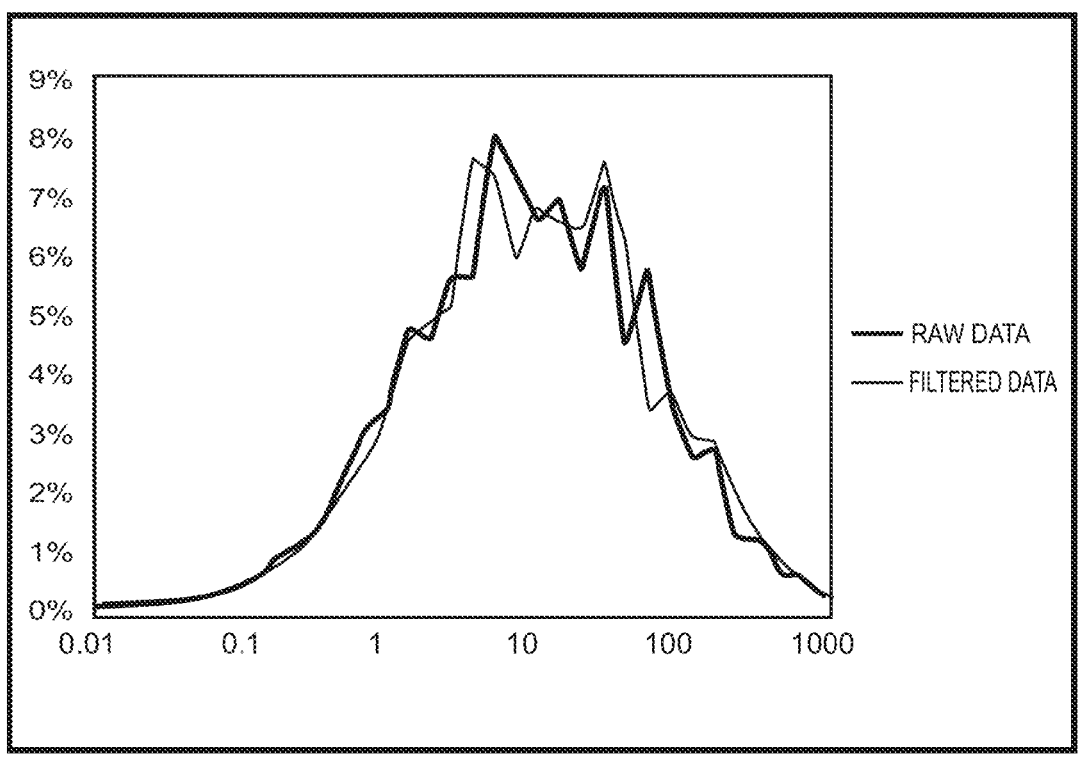
FIG. 1 is a graph illustrating a comparison between a pair of permeability histograms before and after filtering of a database using one standard deviation of the residuals as a filter threshold according to an embodiment of the present invention.

The amount of data removed during the filtering procedure (DBFP) can be viewed with a simple histogram of core permeabilities before and after filtering. FIG. 1, for example, illustrates a comparison of Permeability Histograms before (black) and after filtering (red) of the database using one standard deviation of the residuals as a filter threshold. In this illustrative example, the figure shows that the filtering did not substantially impact the overall permeability distribution. I.e., there was no critical loss of information due to data removal.

Deterministic Permeability Prediction Workflow Using KNN (DPPKNN)

DPPKNN includes the steps of: (1) normalizing the filter database with the normalization percentile parameter ($P_k$); (2) setting a weight (w) for each input log and calculating distance ($d_s$) to the query point; (3) finding the K-nearest neighbors; and (4) calculating permeability from the weighted geometric average value of the KNN, which lead to a deterministic evaluation of permeability from a reference database and distance-based lookup/weighting technique.

1. Normalize Database with Percentile ($P_k$)

A normalization step is provided so that each property can become comparable. For example, a typical Gamma Ray (GR) ranges from 0 to 200 API, where a density log (RHOS) will vary from 2 to 3 g/cc. The normalization step enables each property to have comparable scale and be unit less. Values can therefore be compared one-to-one in a more reasonable fashion. A simple normalization using the $k^{th}$ percentile can be implemented such as:

$$X_i^* = \frac{X_i - P_k}{P_{100-k} - P_k}, \qquad (4)$$

where:

$X_i$ represents the value of a logging tool property (PH IT, PEF, GR, ... ), $X_i^*$, represents the normalized value of a logging tool property X, $P_k$ is the $k^{th}$ percentile of variable X, and $P_{100-k}$ is the 100-$k^{th}$ percentile of variable X (e.g., if k=2, then $P_{100-k}$ is the 98th percentile of X).

2. Set a Weight (w) for Each Input Logs and Calculate Distance ($d_s$) to the Query Point.

Because permeability may be more driven by one logging tool property than another, different weights can be given to each property of the reference database. Weights are often correlated to the degree of correlation between the reference database properties and core permeability. The distance from a query point to an observed sampled data can be calculated, in its general form, as follows:

$$d_s = \sum_i^{N_{prop}} w_i |Property_{i,log}^* - Property_{i,DB}^*|^\beta \qquad (5)$$

where:

$d_s^\dagger$ is the distance from one query point to one sample point of the reference database, $N_{prop}$ is the number of log properties in the reference database, $W_i$ is the property weight that enables the optimization process adjust each logging tool property importance individually, $Property^*_{i,log}$ is a normalized logging tool property value at the query point, $Property^*_{i,D,\beta}$ is a normalized logging tool property value in the reference database, and $\beta$ is the distance power parameter, which enables the fine tuning of the radius of influence around the query point.

†Note, the units of Eq.5 are not mathematically consistent, and thus, were left out for numerical convenience.

3. Find the K-Nearest Neighbors (KNN)

Finding the K-nearest neighbors does not imply any particular mathematical operation, but rather, according to the exemplary embodiment, implies array/matrix management. Once the distances from the query point to all the observed sampled data points from the reference database have been calculated, a sorting process is applied to find the measured data that is closest to the query point based on the distance $d_s$ calculated in Eq. 5. Measured data are ranked from the $1^{st}$ to the $K^{th}$. According to the exemplary configuration, only these $K^{th}$ nearest neighbor data are selected for the next step.

The value of K is usually a user-defined integer and should be the result of a sensitivity analysis since it highly impacts the quality of the prediction. However, it will be shown in the Optimization Procedure (OP) that K can be fixed to a large value (30 nearest neighbors) and distance power parameter β can reasonably be considered to perform the equivalent of a function adjusting K. Accordingly, a user input or selection of K can be rendered unnecessary.

Stated more succinctly, in the classic version of KNN, a integer number is needed for K. However, from an optimization standpoint, although dealing with integers is possible, it is considered difficult because one needs a different type of solver/solving equations. Because most problem solvers deal with continuous variables, there was an unsatisfied need for a methodology to tune the integer K into a continuous K. Because it is impossible to adjust K in a continuous fashion when one uses KNN, according to one or more embodiments, the distance power parameter β is established to, in effect, perform such function.

In an illustrative example, the algorithm is assigned or retrieves or otherwise defaults to large default value for K of say 50. In this example, the value of K will remain fixed. Instead, the distance power parameter β will change, acting as a distance weight. The higher the value of β, the higher the weight of the closest neighbors to a query point when compared to further neighbors. Accordingly, β dictates the influence of the closest and furthest neighbors in the final prediction.

By changing β, there is no need for K, making the specific value of K effectively arbitrary as long as it is sufficiently large. Notably, this is not a case of trading a problem for another, since β can now optimized with solving programs that would be understood by those of ordinary skill in the art, and thus, becomes part of the objective function.

4. Calculate Permeability (K) from the Weighted Geometric Average Value of the KNN Permeability is calculated through a distance weighted average on the K nearest neighbors selected in step 3 and their associated core permeability. Due to a naming conflict, the K from KNN will be renamed "NN" so that "K" can be used to represent permeability in the below equation:

$$\log \tilde{K} = \sum_{i=1}^{NN} \frac{1}{d_{s,i}} \log K_{i,core} \Big/ \sum_{i=1}^{NN} \frac{1}{d_{s,i}}, \quad (6)$$

where:

$\tilde{K}$ is the estimated average core permeability, $K_{i,core}$ is the overburden core permeability of the $i_{th}$ nearest neighbor, $d_s$ is the distance from one query point and one point of the reference data, and NN is the number of Nearest Neighbors.

Note, due to the non-linear behavior of rock permeability, according to the exemplary configuration, permeabilities are averaged in the log space and then brought back in the linear space. Note also, a mathematical instability occurs when Eq. 6 is applied to predict permeability of core data from the reference database, itself. This occurs when the query point matches with an existing measured core data. In this instance, the calculated distance $d_s$ between those two points is zero, making its inverse become infinite. In this case, a minimum distance has to be fixed to prevent this instability. Depending on how small this minimum distance is in contrast with the other nearest neighbors, the prediction can be such that it will match the target core data at the core data location.

It is further important to note that the quality of the prediction depends on the match between target and estimated permeability during a blind test procedure (BTP), described below, and not on the match between the predicted permeability from DPPKNN and the target core data, even optimized. In the latter match, the target core data is used in the permeability prediction of that same core data. Accordingly, such match would not be representative of the permeability prediction quality in un-cored intervals.

Software currently available on the market and using KNN as the core engine for permeability prediction suffer from several drawbacks including, but not limited to the use of arbitrary user inputs (NN, $w_i$, $\beta_i$, $P_k$), a manual and time consuming sensitivity analysis, a manual and time consuming blind test, unclear quality control criteria or objective function, if performed at all, and an unclear estimation of the prediction error, if performed at all.

In order to overcome the above limitations, several additions were made to the core DPPKNN workflow. The next sections give the details of major improvements according to various embodiments of the present invention.

Definition of Prediction Quality Criteria (AAR)

With respect to quality control of the quality of a prediction algorithm, conventional statistical practice is to compare the prediction value to a physically measured data. The difference between the prediction and the measured data is called the residual. Because one is looking at the global prediction error, it was decided that the most efficient criteria would be the Average Absolute Residual (AAR) defined as:

$$AAR = 10^{*}\left[\frac{1}{N}\sum_{i=1}^{N}\left|\log\tilde{\tilde{K}}_i - \log K_{i,core}\right|\right], \quad (7)$$

where:

$K_{i,core}$ is the core permeability co-located to $\tilde{\tilde{K}}_i$, $\tilde{\tilde{K}}_i$ is the estimated permeability through the blind test portion of the optimization procedure (described below), and N is the total number of samples in the reference database.

The AAR basically defines both a quantitative way to evaluate the permeability prediction quality and the objective function used in the optimization step.

Representative Blind Test Procedure (BTP)

Common industry blind test procedures are conducted on a well-by-well basis. This practice is essentially driven by limited software options and computing power needed to allow a core point-by-core point blind test. In weaker data environment, removing one well from a few wells database creates a significant drop in the sample number, and therefore, a significant drop in the prediction quality. Not only will the blind test be "depraved" of the maximum data available, but it will also not be representative of the prediction quality which, contrarily, encompasses the whole data set.

Practical Example

Assuming a training database is made of 100 samples. A prediction will be made on un-cored intervals based on the information carried by the 100 samples. Now, if one wants to test the robustness of this database and its predictive ability, a blind test will be conducted on the 100 sample database. The conventional approach would be to remove a certain amount of this database, for example, 10%, and to predict those 10% from the remaining 90% of the samples of the database. In other words, and based on this practical example, a new prediction based on 90 samples will be performed and cross validated against 10 samples temporarily removed for the analysis. In this case, the robustness and predictive ability of the database is therefore tested on 90 samples when the actual and final prediction is based on the whole database of 100 samples.

According to various embodiments of the invention, these issues of a weaker and unrepresentative blind test can be limited if the blind test is applied on a sample-by-sample basis as opposed to a certain percentage of the database or well-by-well basis.

Figure 2:
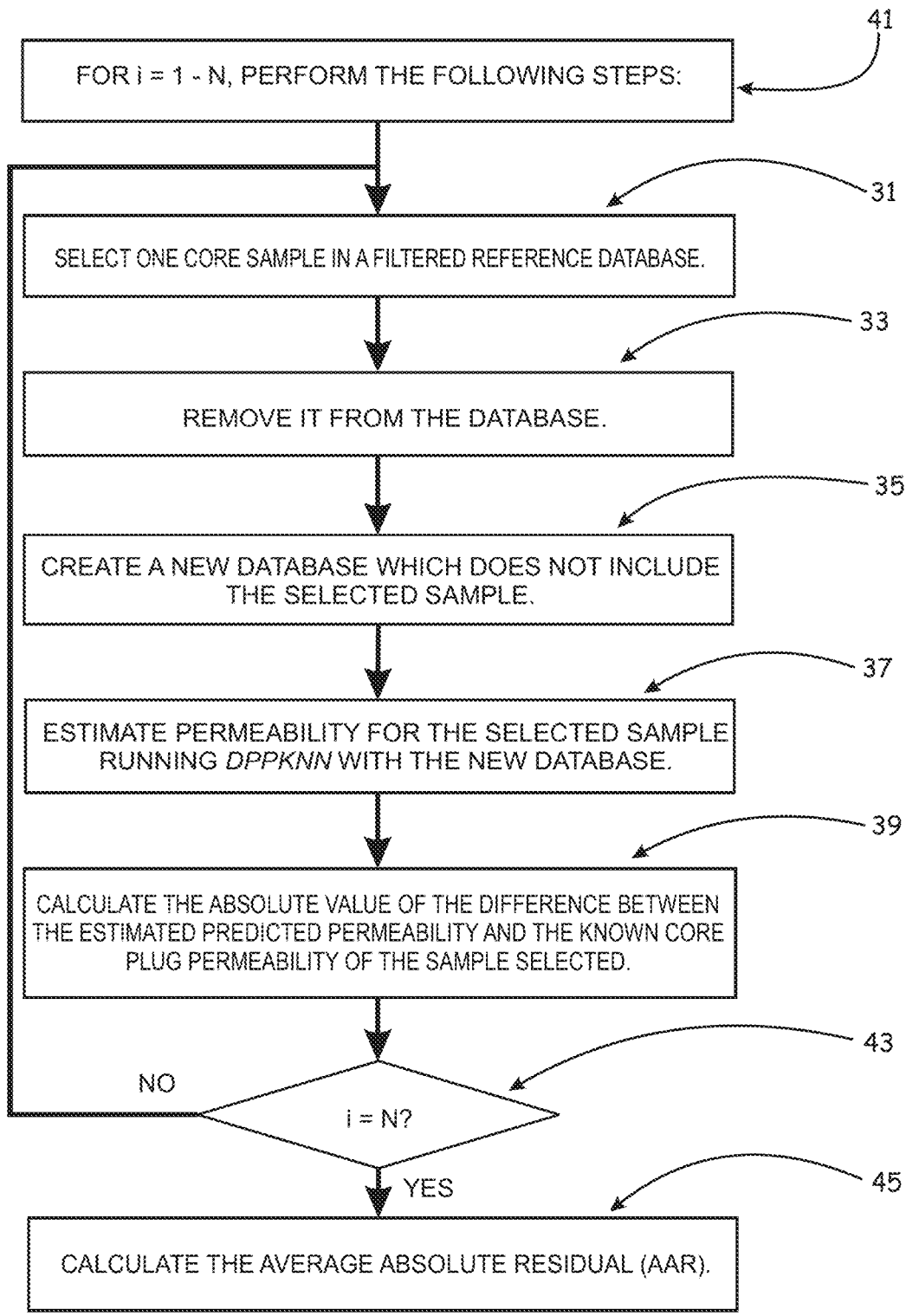
FIG. 2 is a block flow illustrating a core-by-core blind test procedure used to determine an average absolute residual according to an embodiment of the present invention.

Initially FIG. 2 illustrates an exemplary configuration of a core-by-core blind test procedure (BTP). The procedure includes the iterative steps of selecting one core sample (or one line) in the reference database (block 31), removing the selected sample from the database (block 33), and creating a new database which does not include the selected sample (block 35). As described previously, the reference database should be first filtered to remove core data having large porosity discrepancies. The steps also include estimating the permeability $\tilde{\tilde{K}}_i$ for the selected sample by running the deterministic permeability prediction workflow using KNN (DPPKNN) with the newly created database, using Eq.6 (block 37); and calculating the absolute value of the difference between estimated (predicted) permeability and the known core plug permeability of the selected core sample, i.e., residual value (block 39). The steps described by blocks 31, 33, 35, 37, and 39 are then repeated for the remaining N−1 samples from the reference database, until completed (blocks 41, 43). Upon completion, the average absolute residual (AAR) is calculated (block 45).

Optimization Procedure (OP)

According to various embodiments of the invention, an optimization procedure (OP) is provided that employs the newly developed BTP, which provides a process for adjusting variable weights w, the distance power parameter β, and the normalization parameter $P_k$ through a feedback loop until the local minimum of the objective function (AAR) is reached.

Figure 3:
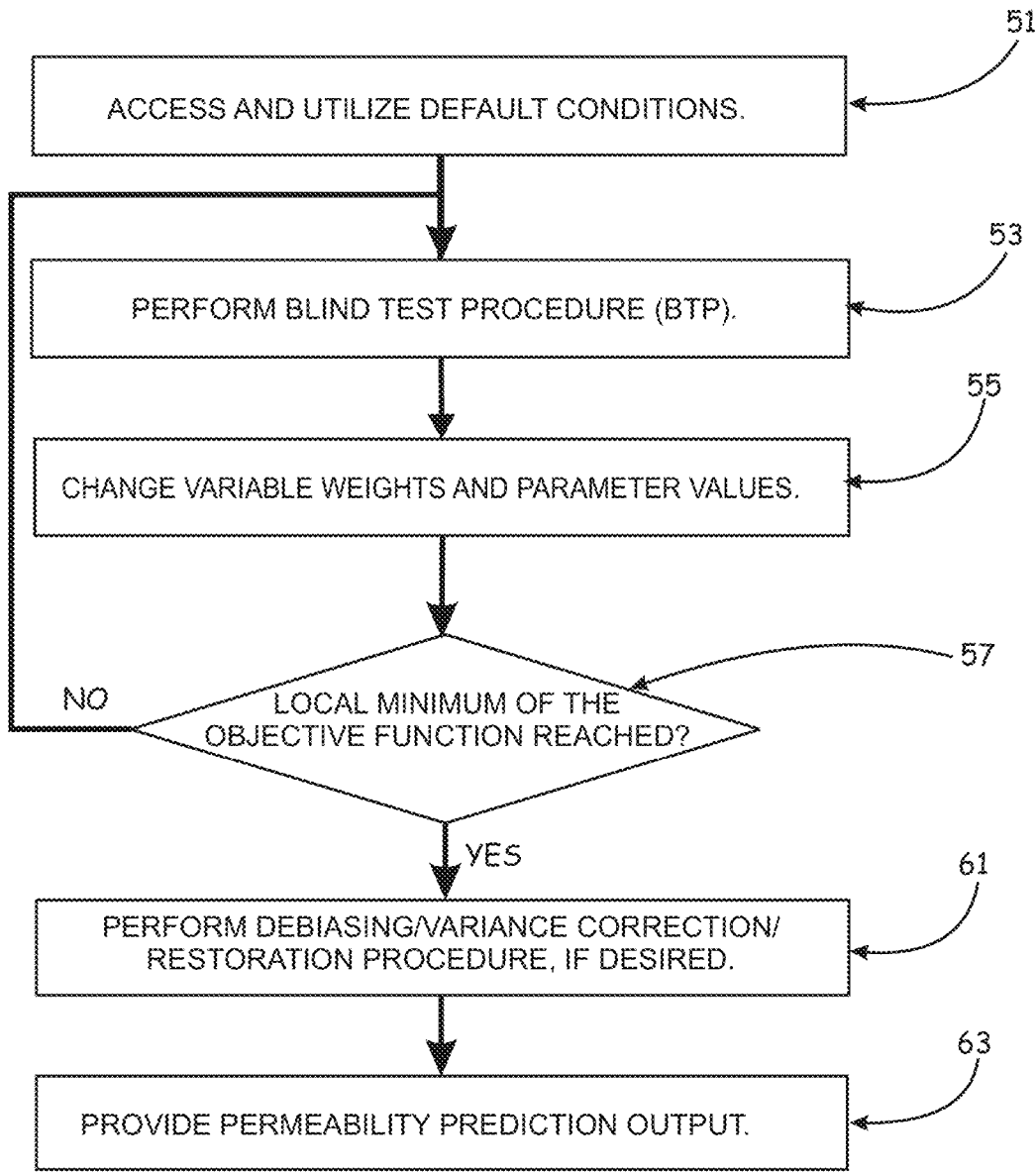
FIG. 3 is a block flow diagram illustrating an optimization procedure employing the core-by-core blind test procedure of FIG. 2 according to an embodiment of the present invention.

FIG. 3 illustrates an exemplary configuration of an optimization procedure employing the core-by-core BTP. The procedure includes the iterative steps of accessing and utilizing default conditions (block 51), performing the BTP (block 53), changing variable weights and parameter values (block 55), and rerunning the OP until local minimum of the objective function (AAR) is reached (block 57).

The step of accessing and utilizing default conditions can include accessing and utilizing initial default variable weights w, the initial default distance power parameter β (as in Eq. 5), and the initial default $k^{th}$ percentile ($P_k$) as used in the normalization step of Eq. 4 to initially normalize the parameters of the database so that each property can be comparable. Typical default values are as follows: The distance power parameter β=1, with $d_s$ (Eq. 5) being the Euclidian distance. For i∈[1; $N_{prop}$], $w_i$=1, all properties have equi-weights in the final prediction. NN∈[1; N], the number of K nearest neighbors should be an integer and can vary from 1 to the number of data in the reference database. Reasonable results have been shown to be achieved when NN ranges from 3 to 30, and statistical robustness and log property coverage of the rock heterogeneity are more optimal when the number of core data N in the reference database is higher than a few hundreds. The step of changing variable weights and parameter values can include changing the variable weights w, distance power parameter β, and the normalization parameter $P_k$.

According to one or more embodiments, the optimization can be performed using a constrained nonlinear optimization algorithm as will be understood by one of ordinary skill in the art. Beneficially, according to the exemplary configuration, the OP not only aids in obtaining optimized parameters to run KNN, but it also enables the calculation of an error prediction at each point of the variable hyperspace where core data is available.

It is important to notice that, according to the exemplary configuration, the OP does not modify the integer number of nearest neighbors NN. As touched upon previously, the reason for this is linked to a numerical limitation of most constrained nonlinear optimization algorithm. In most cases, minimization of an objective function requires all variables to be continuous. A practical and reasonable numerical workaround to ease the program implementation is to change the distance power parameter β instead of NN. Changing β impacts the weights of each neighbor around the query point. As β increases, only the closest neighbors receive more weight in the final weighted average permeability equation, Eq. 6.

Variance Correction Procedure (VCP)

Because of the inherent and underlying averaging techniques used in the vast majority of prediction algorithm (SOM, Neural Network, KNN, Fuzzy logic . . . ), the predicted results tend to show a characteristic bias where the high values are underestimated and the low values are overestimated. The overall predicted results tend to contract towards the average behavior of the data set. This artifact can also be seen as a form of smoothing.

As an attempt to empirically minimize the smoothed behavior of the predicted data, the ratio $\alpha_K$ between the predicted and observed (measured) data can be used to re-introduce the lost reference data variance. For example, while executing the BTP, $a_K$ can be estimated for each sample according to the following equation:

$$\alpha_{K_i} = \frac{K_{i,core}}{\tilde{\tilde{K}}_i}, \tag{8}$$

This ratio can be reintroduced as an additional weight in the classic distance weighted KNN equation (Eq. 6) as:

$$\log \tilde{\tilde{K}}^{\tilde{\tilde{v}}} = \sum_{i=1}^{NN} \frac{1}{d_i} \log \alpha_{K_i} K_{i,core} / \sum_{i=1}^{NN} \frac{1}{d_i}, \tag{9}$$

where $\alpha_{K_i}$, is the ratio of measured and predicted permeability,

K is the estimated debiased core permeability, $K_{i,core}$ is the overburden core permeability of the $i^{th}$ nearest neighbor, $\tilde{\tilde{K}}_i$ is the estimated permeability through the blind test procedure, see Eq. 6, $d_i$ is the distance from one query point and one point of the reference data, and NN is the number of Nearest Neighbors.

A new permeability is therefore calculated (block 61) with a variance that, in many real field examples, was observed to be closer to that of the reference data set. This process can be considered a trade off because the AAR will become higher than the traditional distance weighted KNN of Eq. 6. Nevertheless, the permeability prediction output (block 63) having been subjected to the debiasing/variance correction according to the exemplary configuration, will generally better honor the extreme values of permeability seen in the reference data set. This last point can be very important since flow behavior is primarily driven by the high and low permeabilities of the formation.

FIGS. 4 and 5 illustrate the impact of the variance correction procedure on the permeability prediction. As described above, traditional average based prediction algorithms suffer from smoothing artifact, which in a prediction will typically overestimate the low and underestimate the highs. Because flow in a carbonate reservoir is generally mainly driven by permeability contrast, it can be important to honor extreme ends of permeability distributions. FIG. 4 illustrates an example of the permeability prediction performed without debiasing/variance correction. The blind test curve (green) suffers from this limitation and is conservatively bounded by the core data points (red). FIG. 5, in contrast, illustrates an example of the permeability prediction performed with debiasing/variance correction. The blind test curve (green) shows wider ranges of permeability variations, closer to the core data values and frequency. A similar phenomenom is show in FIG. 6.

Figure 6:
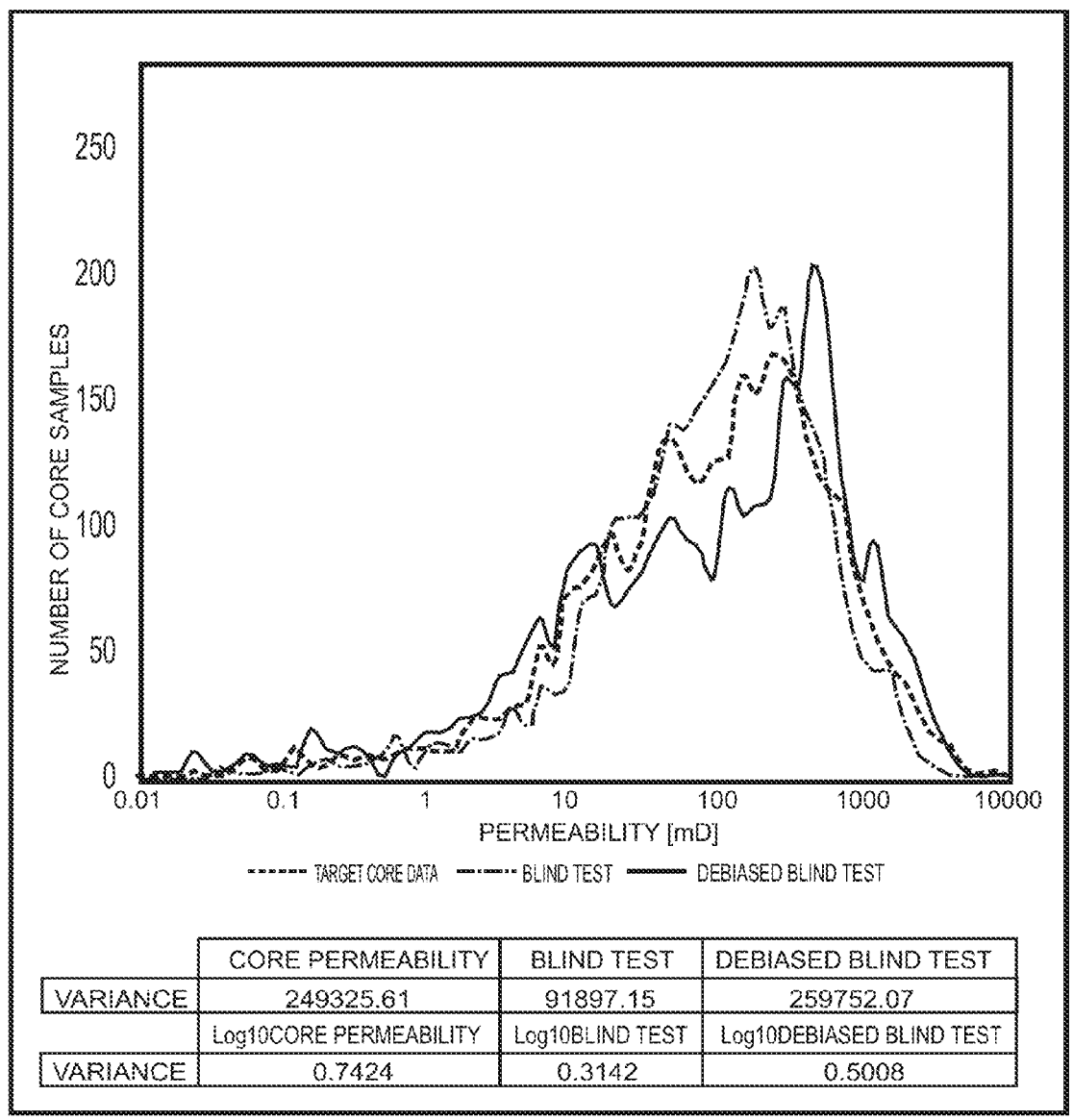
FIG. 6 is a graph illustrating a permeability prediction histogram comparison of blind test data, the variance corrected version of the blind test data, and the target core data according to an embodiment of the present invention.

FIG. 6 illustrates a permeability prediction histogram comparison of blind test data, a debiased/variance corrected version of the blind test data, and the target core data. The variance corrected data provides a noticeable improvement with respect to matching the core distribution. The standard KNN technique, even optimized, can overestimate the lows and underestimate the highs. Variances calculated on the permeability and the log 10 of permeability values show how variances can be restored or partially restored when using the debiasing/variance correction procedure.

Additional Quality Check

QC of the core and log input data can be achieved on the basis of parameter $\alpha_k$ (Eq. 8). A small error in the permeability prediction would tend to mean that both core and log data are valid and consistent with each other. Larger errors correspondingly indicate an inconsistency. This weakness in a permeability prediction typically originates from four common main reasons: (1) bad quality core plug from core poor handling practice which impacts flow (e.g., fractured, partial cleaning, induced compaction . . . ); (2) insufficient sampling resulting in the core plug data being globally or locally statistically weak; (3) erroneous log data caused by washout intervals, presence of barite in the mud, and/or inadequate parameters in the log processing steps (normalization, calibration, environmental corrections . . . ); and (4) the log data and fluid flow not being related. Note, with respect to the fourth main reason, in situations where the repertoire is characterized by heavy diagenesis (e.g., quartz overgrowth, small proportion of illite/smectite, secondary porosity developing from primary porosity), or where there is a particular occurrence of non-clay related radioactivity, other techniques might be required for permeability prediction.

FIG. 7 illustrates a standard permeability-porosity crossplot color painted with log $\alpha_k$ for a clastic reservoir, which can be utilized to quality check the core and log input data. Beneficially, the plot can readily highlight regions of lower prediction quality, and when combined with knowledge of the petrography as well as laboratory and logging company protocols, can provide a powerful and independent aid to flag weak or improper input data.

In the cross plot, the logarithm of $\alpha_{ki}$ is used to represent the discrepancy between predicted and measured permeabilities. A good prediction is achieved with log $\alpha_{ki}$_0 (see zone A). Red color is associated to an overestimation and blue to an underestimation. The plot also shows which sample points were filtered out (small black crosses) from the ones which were selected after the DBFP (colored circle). One can notice that, if some data was already filtered after DBFP, zone B represents a few sample points which were strongly underestimated. Zone B is an area where cracked plugs are commonly found. On the other hand, Zone C, also affected by the DBFP, is believed to mainly suffer from a weak sampling due to a common and preferential biased sampling strategy directed towards good reservoir quality rocks. Other possible causes include higher sensitivity to plug sample preparation due to higher clay content. Ultimately, the plot can provide a roadmap for investigation.

Figure 8:
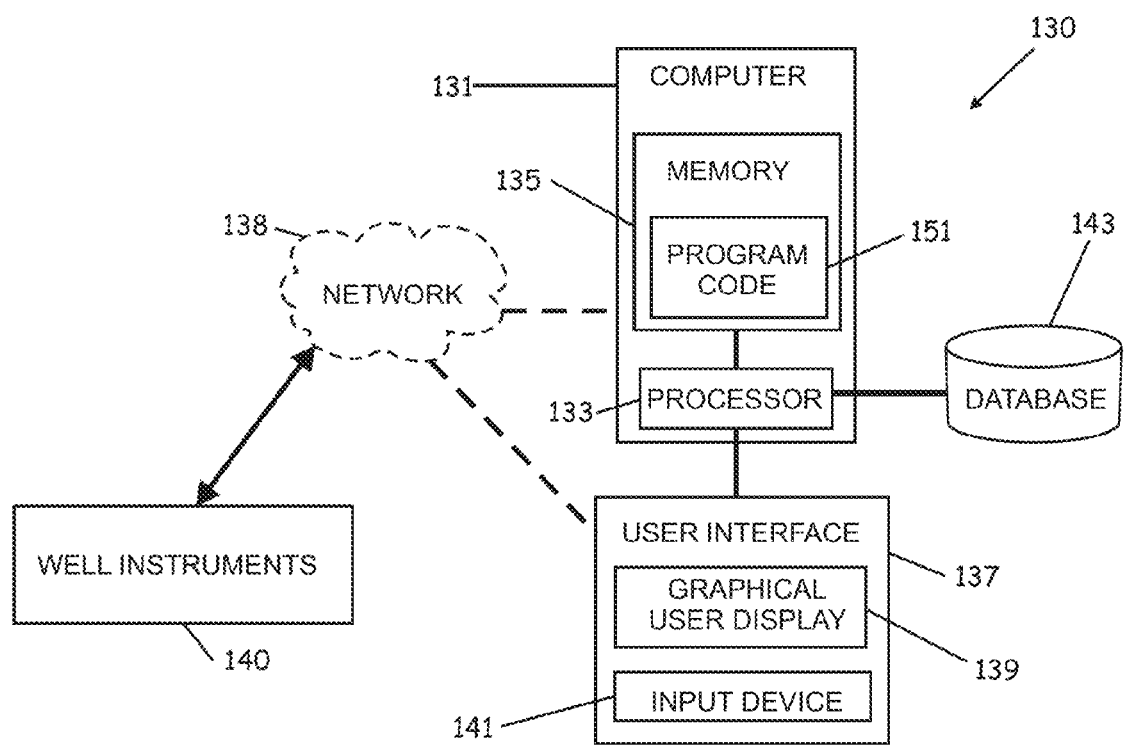
FIG. 8 is a schematic diagram illustrating an apparatus for estimating permeability at unsampled (uncored) but logged interval locations in a reservoir based upon a similarity with log signatures from cored intervals according to an embodiment of the present invention.

FIG. 8 illustrates an apparatus 130 for estimating permeability at unsampled (uncored) but logged interval locations in a reservoir based upon a similarity with log signatures from cored intervals. The apparatus 130 can include a permeability analyzing computer 131 having a processor 133, memory 135 coupled to the processor 133 to store software and database records therein, and a user interface 137 that can include a graphical display 139 for displaying graphical images, and a user input device 141 as known to those skilled in the art, to provide a user access to manipulate the software and database records. Note, the computer 131 can be in the form of a personal computer or in the form of a server or multiple servers serving multiple user interfaces 137. Accordingly, the user interface 137 can be either directly connected to the computer 131 or through a network 138 as known to those skilled in the art. A plurality of well instruments 140 are either in direct coupled communication with the computer 131, for example, via network 138, or in communication via manual delivery and unloading.

The apparatus 130 can also include one or more tables and/or databases 143 stored in memory (internal or external) that is operably coupled to the permeability computer 31, as would be understood by those skilled in the art. The one or more databases 43 can include well log data and cored sample data, along with determined permeability data. Each line of a reference database/training database contains measured data (core and log) which are believed to be representative of the formation complexity. In the case of permeability prediction, each line of the reference database is defined by a measured core permeability and several rows of log properties acquired at the core sample depth such as, for example, X and Y locations, percentage porosity (PHIT), short spacing transient time (DT), bulk density (RHOB), gamma ray (GR), and thermal neutron porosity (TNPL), among others.

The apparatus 130 can also include permeability analyzing program 151 stored in memory 135 of the permeability computer 131 and adapted to estimate permeability at unsampled (uncored) but logged interval locations in a reservoir based upon a similarity with log signatures from cored intervals. Note, the permeability analyzing program 151 can be in the form of microcode, programs, routines, and symbolic languages that provide a specific set or sets of ordered operations that control the functioning of the hardware and direct its operation, as known and understood by those skilled in the art. Note also, the permeability analyzing program 151, according to one or more of the embodiments of the present invention, need not reside in its entirety in volatile memory, but can be selectively loaded, as necessary, according to various methodologies as known and understood by those skilled in the art.

As described in more detail above, various embodiments of the program code 151 and above methods provide a substantial improvement to an existing technology (KNN). For example, one or more embodiments provide a filtering preprocessing based on the discrepancy between log and core porosity that leads to a better prediction (Eq. 1-3). According to one or more embodiments, the input parameters traditionally arbitrarily fixed by the user are optimized through a constrained nonlinear optimization algorithm, and the individual weights of every input property influencing the output KNN-based permeability prediction type can be optimized (Eq. 5). According to one or more embodiments, residuals from a blind test on a one-by-one sample basis, as described in the BTP, are defined as the most effective and least biased objective function to minimize (Eq. 7); and/or the latter objective function sets the basis for measurable and easy-to-interpret quality criteria and QC of the permeability prediction. According to one or more embodiments, the method can, if desired, automatically match the core data at the core data location, with a result that high and low permeabilities are better honored than by the standard KNN approach through a simple variance correction procedure (Eq. 8-9). This step also helps to reduce, if not eliminate, the use of arbitrary permeability multipliers at the reservoir simulation step.

According to one or more embodiments, the implementation of the algorithm can be easily achieved so that the above identified steps and the standard KNN procedure is fully automated. According to one or more embodiments, through automation and optimization, the method delivers faster and higher quality results than the current KNN based techniques, and/or can provide aid to identify bad quality log interval and/or core samples and target zones for permeability sample acquisition (FIG. 7). Further, according to one or more embodiments, the above-described embodiments of "K+"-based methods, program code, computer readable medium, and apparatus enables both optimization and automation of multiple tasks, which would not be feasible within the regular time frame of a formation evaluation study. Furthermore, innovative techniques like sample-by-sample blind test and a variance correction procedure add and complement the value of previous optimization and automation improvements. Additionally, the above-described methodologies have shown practical improvements in the reservoir simulation of mature reservoirs in Saudi Arabia, where the use of arbitrary permeability multipliers was reduced thanks to a more faithful estimation of the reservoir permeability heterogeneity.

It is important to note that while the foregoing embodiments of the present invention have been described in the context of a fully functional system and process, those skilled in the art will appreciate that the mechanism of at least portions of the present invention and/or aspects thereof are capable of being distributed in the form of a computer readable medium in a variety of forms storing a set of instructions for execution on a processor, processors, or the like, and that various embodiments of the present invention apply equally regardless of the particular type of media used to actually carry out the distribution. Examples of the computer readable media include, but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, HD-DVDs, memory sticks, mini disks, laser disks, Blu-ray disks, flash drives, and other newer types of memories, and certain types of transmission type media such as, for example, digital and analog communication links capable of storing the set of instructions, with the exception of those considered to be non-statutory subject matter. Such media can contain, for example, both operating instructions and the operations instructions related to the program product 51, and the computer executable portions of the method steps according to the various embodiments of a method of estimating permeability at unsampled (uncored) but logged interval locations in a reservoir based upon a similarity with log signatures from cored intervals.

Various embodiments of the present invention have several advantages. For example, at least in a global sense provides increased accuracy, high speed of execution, and enables the user to test several configurations. Advantageously, one or more embodiments are based on the use and improvement of the K Nearest Neighbor (KNN) concept as the core engine for permeability prediction, and can be employed without the need to employ other machine learning predictive algorithms, such as Neural Network. One or more embodiments of the present invention advantageously provide an optimization loop between results and input data. Current industry standard practice for permeability prediction using KNN remains mostly manual. Feedback loops and parameter optimization through objective function minimization are in most case very tedious, manual, time consuming and/or left to advanced users. In most cases, the number of scenarios that a human user can run through is limited and biased. In contrast, this embodiment or embodiments provide a robust Quality Assurance (QA) lacking in the industry.

Additionally, one or more embodiments advantageously provide for optimization of KNN parameters that are usually arbitrarily fixed and not accessible in commercial software packages. One or more embodiments provide for optimization of the individual weight of every input property type on the output KNN-based permeability prediction. The user can therefore automatically find out which rock property(ies) and which log(s) are the most adapted to predict permeability. This option does not exist in commercial packages or would represent an extremely time-consuming and tedious task to achieve with current technology. The added flexibility provided by the one or more embodiments makes the result more accurate than any current technology, and provides a robust an additional QA procedure.

Advantageously, according to one or more embodiments, the optimization procedure is based on a core plug-by-core plug blind test. The industry standard is a well-by-well or at most interval by interval blind test. A plug-by-plug blind test with the current technology would represent a tremendously time-consuming and tedious task to achieve according to conventional means. However, in order to achieve reference database robustness, the database needs to be tested with the least sampling disturbances a possible.

Advantageously, the procedure according to one or more embodiments is statistically more representative examination of the database predictability potential than through conventional well blind test procedures. For example, in the simple case of a 10 equi-sampled cored well database, removing the data from one well for blind test will reduce the reference data by 10%. The new and reduced reference database used for the blind test of this one well becomes, therefore, different from the original and complete reference database. As a consequence, the prediction on this one well will not be accomplished under the same conditions as the final prediction un-cored intervals, which makes use of the complete and un-truncated reference database. By removing only one sample from the reference database under an automated process, for example, the one or more embodiments open the door to an unthinkable task according to conventional technology, and provides a more representative test of the reference database predictive capabilities.

One or more embodiments advantageously provide for utilization of a variance correction procedure as part of the workflow. Current industry standard does not generally include statistically debiasing the permeability prediction output. In contrast, the variance correction procedure according to the one or more embodiments is simple and has been proven on real data. It is built in and automated in the overall workflow, contrary to the previously time-consuming manual procedures limited to advanced users. This procedure also helps to reduce if not eliminate the use of arbitrary permeability multipliers at the reservoir simulation step.

One or more embodiments advantageously provide a fast and high quality delivery. The methodology was designed so that all procedures and sub-procedures can be automated into a single program. According to the one or more embodiments, the overall automated and optimized process typically takes approximately 10 to 30 minutes depending on the data set size. In contrast, a partial comparison is typically accomplished with traditional consulting time of 1 to 3 weeks for a permeability prediction on study. The comparison with existing technology can only be partial since the computer based optimization process according to the one or more embodiments can run through more cases, with limited psychological bias and quickly execute what would conventionally be a time-consuming procedure that a human user may have to deliberately compromise due to project frame deadlines.

One or more embodiments advantageously provide an aid to identifying bad quality log interval, core samples and target zones for permeability sample acquisition. The comparison of the plug-by-plug blind test results with the measured core plug permeability provides a relatively accurate indicator of the quality of the prediction. The prediction quality decreases substantially as the "neighbor" permeability samples become less and less representative of the estimated plug. This degradation generally comes from four main factors: (1) bad quality core plugs as a result of poor core handling practices impacting flow (fractured, partial cleaning, induced compaction, ... ). (2) insufficient sampling resulting in the core plug data being globally or locally statistically weak; (3) erroneous log data typically as a result of washout intervals, presence of barite in the mud, inadequate parameters in the log processing steps (normalization, calibration, environmental corrections, ... ); and (4) log data and fluid flow are not being related such as, for example, as a result of the existence of heavy diagenesis (quartz overgrowth, small proportion of illite/smectite, secondary porosity developing from primary porosity), or particular occurrence of non-clay related radioactivity, which may require other techniques be used for permeability prediction.

One or more embodiments advantageously provide for the use of a standard Porosity-Permeability plot on which a prediction-to-measured permeability ratio is overlaid which can serve to highlight regions of lower prediction quality. Combined with knowledge of the petrography as well as laboratory and logging company protocols, this technology provides a powerful and independent aid to flag weak or improper input data. Quality check (QC) of the core and log input data can advantageously be readily achieved.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

The invention claimed is:

1. A method for estimating permeability at unsampled but logged interval locations in a reservoir, the method comprising the steps of:
    performing an optimization procedure by a computer, the optimization procedure comprising the steps of:
        selecting initial values of weights for each of a plurality of reservoir properties and an initial value of a distance power parameter when respective default values are not assigned or to be utilized,
        performing a blind test procedure on a reference database comprising one or more databases or lookup tables containing one or more data sets of measured well log values of the plurality of reservoir properties and a corresponding one or more data sets of measured core values of the plurality of reservoir properties for a plurality of core samples extracted from a plurality of core sample locations in a reservoir,
        changing the values of one or more of the weights of the plurality of reservoir properties and the value of the distance power parameter,
        repeating the step of performing the blind test procedure utilizing the changed values and changing the values of one or more of the weights of the plurality of reservoir properties and the value of the distance power parameter, until local minimum of an absolute average residual value is reached to thereby determine optimized values of the weights for the plurality of reservoir properties and an optimized value of the distance power parameter; and
    performing a deterministic permeability prediction workflow utilizing the optimized values of the weights for the plurality of reservoir properties and the optimized value of the distance power parameter to calculate permeability at query point or an unsampled but logged interval location encompassing the query point.

2. A method as defined in claim 1,
    wherein the optimization procedure further comprises receiving, accessing, or determining an initial value of a normalization parameter to normalize the reference database;
    wherein the reference database is a filtered normalized reference database;
    wherein the step of repeating the step of performing the blind test procedure until local minimum of the absolute average residual value is further performed to thereby determine an optimized value of the normalization parameter; and
    wherein the step of performing a deterministic permeability prediction workflow includes applying the optimized normalization parameter to the reference database.

3. A method as defined in claim 1, further comprising the step of performing a variance correction procedure, comprising:
    calculating a ratio between measured permeability and predicted permeability for each of the plurality of sampled cores identified as nearest neighbors to the query point or location interval; and
    calculating a distance weighted average permeability at the query point or location interval based upon the measured permeability of each of a plurality of identified nearest neighbors and the calculated ratio between the measured permeability and the predicted permeability of each of the plurality of identified nearest neighbors.

4. A method as defined in claim 1, wherein the plurality of reservoir properties includes porosity, the method further comprising the steps of:
    filtering a database based on a level of a statistical match between measured core porosity and computed log porosity to remove unphysical extreme data to thereby form the reference database, the step of filtering including:
        removing collocated log and core data having large porosity discrepancies exceeding a certain level of difference between log and core porosity so that the two respective data types are coherent with each other, and
        performing a comparison of a permeability histogram for a raw unfiltered form of the reference database with permeability histogram for the filtered form of the reference database to thereby quantify the amount of data removed during the filtering as a quality control measure to ensure that the filtering did not excessively impact the overall permeability distribution; and
    normalizing each of the plurality of properties at each of the plurality of core sample locations in the filtered database.

5. A method as defined in claim 1, wherein the blind test procedure comprises the steps of:
    removing one of the plurality of core samples from a filtered database to thereby create a new database which does not include the removed core sample,
    estimating permeability for the removed core sample according to the deterministic permeability prediction workflow;

calculating an absolute value of the difference between the estimated permeability and known permeability of the removed core sample;

repeating the steps of removing of one of the core samples, estimating permeability, and calculating an absolute value for each other of the plurality of core samples from the filtered database, and determining an absolute average residual value of a difference between the estimated permeability and known permeability for the plurality of core samples.

6. A method as defined in claim 5, wherein the step of estimating permeability for the removed course sample for the blind test procedure comprises the steps of:

determining a distance between the core sample location of the removed core sample and the core sample location of each other of the plurality of core samples in the new database, each respective distance based upon a weighted difference between a well log property value of one of the reservoir properties at the core sample location of the removed core sample and a core sample property value of the one of the plurality of reservoir properties of one of the other of the plurality of core samples, calculated for each separate one of the plurality of reservoir properties;

ranking the plurality of core samples based upon the determined distances;

determining a heuristically optimal number of K nearest neighbors responsive to a sensitivity analysis, or selecting a sufficiently large number of K nearest neighbors when a respective default value is not assigned or to be utilized; and calculating the estimated permeability of the removed core sample based upon a weighted geometric average of the permeability of each identified K-nearest neighbors and corresponding determined distance between the core sample location of the removed core sample and the respective core sample location of each optimal or selected K nearest neighbors.

7. A method as defined in claim 5, wherein the blind test procedure further comprises the step of:

calculating a ratio between the known permeability and the estimated permeability for the removed sample core.

8. A method as defined in claim 1, wherein the deterministic permeability prediction workflow comprises the steps of:

determining a distance between the query point or location interval and the core sample location of each of the plurality of core samples in the reference database, each respective distance based upon a weighted difference between a well log property value of one of the reservoir properties at the query point or location interval and a sampled core property value of the one of the plurality of reservoir properties of one of the plurality of core samples, calculated for each separate one of the plurality of reservoir properties;

ranking the plurality of core samples based upon the determined distances;

determining a heuristically optimal number of nearest neighbors responsive to a sensitivity analysis or selecting a sufficiently large number of K nearest neighbors; and calculating a distance weighted average permeability at the query point based upon the permeability of the identified number of K nearest neighbors.

9. A computer-assisted method for estimating permeability at unsampled but logged interval locations in a reservoir, the method comprising the steps of:

providing a database comprising one or more databases or lookup tables containing one or more data sets of measured well log values of a plurality of reservoir properties and a corresponding one or more data sets of measured core values of the plurality of reservoir properties for a plurality of core samples extracted from a plurality of core sample locations in a reservoir, the plurality of reservoir properties including porosity;

filtering the database based on a level of a statistical match between measured core porosity and computed log porosity to remove unphysical extreme data to thereby form a reference database, the step of filtering including:

removing collocated log and core data having large porosity discrepancies exceeding a certain level of difference between log and core porosity so that the two respective data types are coherent with each other, and performing a graphical comparison of a permeability histogram for a raw unfiltered form of the reference database with permeability histogram for the filtered form of the reference database to thereby quantify the amount of data removed during the filtering as a quality control measure to ensure that the filtering did not excessively impact the overall permeability distribution;

normalizing each of the plurality of properties at each of the plurality of core sample locations in the filtered database using an initial value of a normalization parameter;

selecting initial values of weights for each of a plurality of reservoir properties, an initial value of a distance power parameter, and the initial value of a normalization parameter when respective default values are not assigned or to be utilized;

performing an optimization procedure by a computer, the optimization procedure comprising:

performing a blind test procedure on the reference database, to include the steps of:

removing one of the plurality of core samples from the filtered database to thereby create a new database which does not include the removed core sample, estimating permeability for the removed core sample according to the deterministic permeability prediction workflow, calculating an absolute value of the difference between the estimated permeability and known permeability of the removed core sample, repeating the steps of removing of one of the core samples, estimating permeability, and calculating an absolute value for each other of the plurality of core samples from the filtered database, and determining an absolute average residual value of a difference between the estimated permeability and known permeability for the plurality of core samples, changing the values of one or more of the weights of the plurality of reservoir properties, the value of the distance power parameter, and the value of the normalization parameter, and repeating the step of performing the blind test procedure utilizing the changed values and changing the values of one or more or all of the weights of the plurality of reservoir properties, the value of the distance power parameter, and value of the normalization parameter until local minimum of an absolute average residual value is reached to thereby determine optimized values of the weights for the plurality of reservoir properties, an optimized value of the distance power parameter, and an optimized value of the normalization parameter; and performing a deterministic permeability prediction workflow utilizing the optimized values of the weights for the plurality of reservoir properties, the optimized value of the distance power parameter, and the optimized value of the normalization parameter to calculate permeability at a query point or an unsampled but logged interval location encompassing the query point.

10. A method as defined in claim 9,
wherein the step of estimating permeability for the removed course sample for the blind test procedure comprises the steps of:
determining a distance between the core sample location of the removed core sample and the core sample location of each other of the plurality of core samples in the new database, each respective distance based upon a weighted difference between a well log property value of one of the reservoir properties at the core sample location of the removed core sample and a core sample property value of the one of the plurality of reservoir properties of one of the other of the plurality of core samples, calculated for each separate one of the plurality of reservoir properties,
ranking the plurality of core samples based upon the determined distances,
determining a heuristically optimal number of K nearest neighbors responsive to a sensitivity analysis, or selecting a sufficiently large number of K nearest neighbors when a respective default value is not assigned or to be utilized, and
calculating the estimated permeability of the removed core sample based upon a weighted geometric average of the permeability of each identified K-nearest neighbors and corresponding determined distance between the core sample location of the removed core sample and the respective core sample location of each optimal or selected K nearest neighbors; and
wherein the blind test procedure incorporates the step of calculating a ratio between the known permeability and the estimated permeability for the removed sample core.

11. A method as defined in claim 9, wherein the deterministic permeability prediction workflow comprises the steps of:
determining a distance between a query point or location interval and the core sample location of each of the plurality of core samples in the reference database, each respective distance based upon a weighted difference between a well log property value of one of the reservoir properties at the query point or location interval and a sampled core property value of the one of the plurality of reservoir properties of one of the plurality of core samples, calculated for each separate one of the plurality of reservoir properties;
ranking the plurality of core samples based upon the determined distances;
determining a heuristically optimal number of nearest neighbors responsive to a sensitivity analysis or selecting a sufficiently large number of K nearest neighbors; and
calculating a distance weighted average permeability at the query point based upon the permeability of the identified number of K nearest neighbors.

12. A method as defined in claim 9, further comprising the step of performing a variance correction procedure, comprising:
calculating a ratio between measured permeability and predicted permeability for each of the plurality of sampled cores identified as nearest neighbors to a query point or location interval; and
calculating a distance weighted average permeability at the query point or location interval based upon the measured permeability of each of a plurality of identified nearest neighbors and the calculated ratio between the measured permeability and the predicted permeability of each of the plurality of identified nearest neighbors.

13. A non-transitory computer readable medium having processor readable code embodied on the computer readable medium, the processor readable code for programming one or more processors to perform the operations of estimating permeability at unsampled but logged interval locations in a reservoir, the operations comprising:
performing an optimization procedure, the optimization procedure comprising the operations of:
selecting initial values of weights for each of a plurality of reservoir properties and an initial value of a distance power parameter when respective default values are not assigned or to be utilized,
performing a blind test procedure on a reference database comprising one or more databases or lookup tables containing one or more data sets of measured well log values of the plurality of reservoir properties and a corresponding one or more data sets of measured core values of the plurality of reservoir properties for a plurality of core samples extracted from a plurality of core sample locations in a reservoir,
changing the values of one or more of the weights of the plurality of reservoir properties and the value of the distance power parameter,
repeating the operation of performing the blind test procedure utilizing the changed values and changing the values of one or more of the weights of the plurality of reservoir properties and the value of the distance power parameter, until local minimum of an absolute average residual value is reached to thereby determine optimized values of the weights for the plurality of reservoir properties and an optimized value of the distance power parameter; and
performing a deterministic permeability prediction workflow utilizing the optimized values of the weights for the plurality of reservoir properties and the optimized value of the distance power parameter to calculate permeability at query point or an unsampled but logged interval location encompassing the query point.

14. A non-transitory computer readable medium as defined in claim 13,
wherein the optimization procedure further comprises receiving, accessing, or determining an initial value of a normalization parameter to normalize the reference database;
wherein the reference database is a filtered normalized reference database;
wherein the operation of repeating the operation of performing the blind test procedure until local minimum of the absolute average residual value is further performed to thereby determine an optimized value of the normalization parameter; and
wherein the operation of performing a deterministic permeability prediction workflow includes applying the optimized normalization parameter to the reference database.

15. A non-transitory computer readable medium as defined in claim 13, wherein the operations further comprise performing a variance correction procedure, comprising:
  calculating a ratio between measured permeability and predicted permeability for each of the plurality of sampled cores identified as nearest neighbors to the query point or location interval; and
  calculating a distance weighted average permeability at the query point or location interval based upon the measured permeability of each of a plurality of identified nearest neighbors and the calculated ratio between the measured permeability and the predicted permeability of each of the plurality of identified nearest neighbors.

16. A non-transitory computer readable medium as defined in claim 13, wherein the plurality of reservoir properties includes porosity, the operations further comprising:
  filtering a database based on a level of a statistical match between measured core porosity and computed log porosity to remove unphysical extreme data to thereby form the reference database, the operation of filtering including:
    removing collocated log and core data having large porosity discrepancies exceeding a certain level of difference between log and core porosity so that the two respective data types are coherent with each other, and
    performing a comparison of a permeability histogram for a raw unfiltered form of the reference database with permeability histogram for the filtered form of the reference database to thereby quantify the amount of data removed during the filtering as a quality control measure to ensure that the filtering did not excessively impact the overall permeability distribution; and
  normalizing each of the plurality of properties at each of the plurality of core sample locations in the filtered database.

17. A non-transitory computer readable medium as defined in claim 13, wherein the blind test procedure comprises the operations of:
  removing one of the plurality of core samples from a filtered database to thereby create a new database which does not include the removed core sample,
    estimating permeability for the removed core sample according to the deterministic permeability prediction workflow;
  calculating an absolute value of the difference between the estimated permeability and known permeability of the removed core sample;
  repeating the operations of removing of one of the core samples, estimating permeability, and calculating an absolute value for each other of the plurality of core samples from the filtered database, and
  determining an absolute average residual value of a difference between the estimated permeability and known permeability for the plurality of core samples.

18. A non-transitory computer readable medium as defined in claim 17, wherein the operation of estimating permeability for the removed course sample for the blind test procedure comprises the operations of:
  determining a distance between the core sample location of the removed core sample and the core sample location of each other of the plurality of core samples in the new database, each respective distance based upon a weighted difference between a well log property value of one of the reservoir properties at the core sample location of the removed core sample and a core sample property value of the one of the plurality of reservoir properties of one of the other of the plurality of core samples, calculated for each separate one of the plurality of reservoir properties;
  ranking the plurality of core samples based upon the determined distances;
  determining a heuristically optimal number of K nearest neighbors responsive to a sensitivity analysis, or selecting a sufficiently large number of K nearest neighbors when a respective default value is not assigned or to be utilized; and
  calculating the estimated permeability of the removed core sample based upon a weighted geometric average of the permeability of each identified K-nearest neighbors and corresponding determined distance between the core sample location of the removed core sample and the respective core sample location of each optimal or selected K nearest neighbors.

19. A non-transitory computer readable medium as defined in claim 17, wherein the blind test procedure further comprises the operation of:
  calculating a ratio between the known permeability and the estimated permeability for the removed sample core.

20. A non-transitory computer readable medium as defined in claim 13, wherein the deterministic permeability prediction workflow comprises the operations of:
  determining a distance between the query point or location interval and the core sample location of each of the plurality of core samples in the reference database, each respective distance based upon a weighted difference between a well log property value of one of the reservoir properties at the query point or location interval and a sampled core property value of the one of the plurality of reservoir properties of one of the plurality of core samples, calculated for each separate one of the plurality of reservoir properties;
  ranking the plurality of core samples based upon the determined distances;
  determining a heuristically optimal number of nearest neighbors responsive to a sensitivity analysis or selecting a sufficiently large number of K nearest neighbors; and
  calculating a distance weighted average permeability at the query point based upon the permeability of the identified number of K nearest neighbors.

21. A non-transitory computer readable medium having processor readable code embodied on the computer readable medium, the processor readable code for programming one or more processors to perform the operations of estimating permeability at unsampled but logged interval locations in a reservoir, the operations comprising:
  accessing a database comprising one or more databases or lookup tables containing one or more data sets of measured well log values of a plurality of reservoir properties and a corresponding one or more data sets of measured core values of the plurality of reservoir properties for a plurality of core samples extracted from a plurality of core sample locations in a reservoir, the plurality of reservoir properties including porosity;
  filtering the database based on a level of a statistical match between measured core porosity and computed log porosity to remove unphysical extreme data to thereby form a reference database, the operation of filtering including:
    removing collocated log and core data having large porosity discrepancies exceeding a certain level of difference between log and core porosity so that the two respective data types are coherent with each other, and providing for display of a graphical comparison of a permeability histogram for a raw unfiltered form of the reference database with permeability histogram for the filtered form of the reference database to thereby quantify the amount of data removed during the filtering as a quality control measure to ensure that the filtering did not excessively impact the overall permeability distribution;

normalizing each of the plurality of properties at each of the plurality of core sample locations in the filtered database using an initial value of a normalization parameter;

receiving user selected initial values of weights for each of a plurality of reservoir properties, an initial value of a distance power parameter, and the initial value of a normalization parameter when respective default values are not assigned or to be utilized;

performing an optimization procedure, the optimization procedure comprising:
  performing a blind test procedure on the reference database, to include the operations of:
    removing one of the plurality of core samples from the filtered database to thereby create a new database which does not include the removed core sample,
    estimating permeability for the removed core sample according to the deterministic permeability prediction workflow, calculating an absolute value of the difference between the estimated permeability and known permeability of the removed core sample,
    repeating the operations of removing of one of the core samples, estimating permeability, and calculating an absolute value for each other of the plurality of core samples from the filtered database, and
    determining an absolute average residual value of a difference between the estimated permeability and known permeability for the plurality of core samples,
  changing the values of one or more of the weights of the plurality of reservoir properties, the value of the distance power parameter, and the value of the normalization parameter, and
  repeating the operation of performing the blind test procedure utilizing the changed values and changing the values of one or more or all of the weights of the plurality of reservoir properties, the value of the distance power parameter, and value of the normalization parameter until local minimum of an absolute average residual value is reached to thereby determine optimized values of the weights for the plurality of reservoir properties, an optimized value of the distance power parameter, and an optimized value of the normalization parameter; and performing a deterministic permeability prediction workflow utilizing the optimized values of the weights for the plurality of reservoir properties, the optimized value of the distance power parameter, and the optimized value of the normalization parameter to calculate permeability at a query point or an unsampled but logged interval location encompassing the query point.

22. A non-transitory computer readable medium as defined in claim 21, wherein the operation of estimating permeability for the removed course sample for the blind test procedure comprises the operations of:
  determining a distance between the core sample location of the removed core sample and the core sample location of each other of the plurality of core samples in the new database, each respective distance based upon a weighted difference between a well log property value of one of the reservoir properties at the core sample location of the removed core sample and a core sample property value of the one of the plurality of reservoir properties of one of the other of the plurality of core samples, calculated for each separate one of the plurality of reservoir properties,
  ranking the plurality of core samples based upon the determined distances,
  determining a heuristically optimal number of K nearest neighbors responsive to a sensitivity analysis, or selecting a sufficiently large number of K nearest neighbors when a respective default value is not assigned or to be utilized, and
  calculating the estimated permeability of the removed core sample based upon a weighted geometric average of the permeability of each identified K-nearest neighbors and corresponding determined distance between the core sample location of the removed core sample and the respective core sample location of each optimal or selected K nearest neighbors; and
wherein the blind test procedure incorporates the operation of calculating a ratio between the known permeability and the estimated permeability for the removed sample core.

23. A non-transitory computer readable medium as defined in claim 21, wherein the deterministic permeability prediction workflow comprises the operations of:
  determining a distance between a query point or location interval and the core sample location of each of the plurality of core samples in the reference database, each respective distance based upon a weighted difference between a well log property value of one of the reservoir properties at the query point or location interval and a sampled core property value of the one of the plurality of reservoir properties of one of the plurality of core samples, calculated for each separate one of the plurality of reservoir properties;
  ranking the plurality of core samples based upon the determined distances;
  determining a heuristically optimal number of K nearest neighbors responsive to a sensitivity analysis or selecting a sufficiently large number of K nearest neighbors; and
  calculating a distance weighted average permeability at the query point based upon the permeability of the identified number of K nearest neighbors.

24. A non-transitory computer readable medium as defined in claim 21, wherein the operations further comprise performing a variance correction procedure, comprising:
  calculating a ratio between measured permeability and predicted permeability for each of the plurality of sampled cores identified as nearest neighbors to a query point or location interval; and
  calculating a distance weighted average permeability at the query point or location interval based upon the measured permeability of each of a plurality of identified nearest neighbors and the calculated ratio between the measured permeability and the predicted permeability of each of the plurality of identified nearest neighbors.

25. An apparatus for estimating permeability at unsampled but logged interval locations in a reservoir, the apparatus comprising:
- a permeability analyzing computer including a processor and memory coupled to the processor; and
- permeability analyzing program code adapted to cause the permeability analyzing computer to estimating permeability at unsampled but logged interval locations in a reservoir, the program code stored in the memory of the permeability analyzing computer and including instructions that when executed by the permeability analyzing computer, cause the computer to perform the operations of:
  - performing an optimization procedure, the optimization procedure comprising the operations of:
    - selecting initial values of weights for each of a plurality of reservoir properties and an initial value of a distance power parameter when respective default values are not assigned or to be utilized,
    - performing a blind test procedure on a reference database comprising one or more databases or lookup tables containing one or more data sets of measured well log values of the plurality of reservoir properties and a corresponding one or more data sets of measured core values of the plurality of reservoir properties for a plurality of core samples extracted from a plurality of core sample locations in a reservoir,
    - changing the values of one or more of the weights of the plurality of reservoir properties and the value of the distance power parameter,
    - repeating the operation of performing the blind test procedure utilizing the changed values and changing the values of one or more of the weights of the plurality of reservoir properties and the value of the distance power parameter, until local minimum of an absolute average residual value is reached to thereby determine optimized values of the weights for the plurality of reservoir properties and an optimized value of the distance power parameter; and
  - performing a deterministic permeability prediction workflow utilizing the optimized values of the weights for the plurality of reservoir properties and the optimized value of the distance power parameter to calculate permeability at query point or an unsampled but logged interval location encompassing the query point.

26. An apparatus as defined in claim 25,
- wherein the optimization procedure further comprises receiving, accessing, or determining an initial value of a normalization parameter to normalize the reference database;
- wherein the reference database is a filtered normalized reference database;
- wherein the operation of repeating the operation of performing the blind test procedure until local minimum of the absolute average residual value is further performed to thereby determine an optimized value of the normalization parameter; and
- wherein the operation of performing a deterministic permeability prediction workflow includes applying the optimized normalization parameter to the reference database.

27. An apparatus as defined in claim 25, wherein the operations further comprise performing a variance correction procedure, comprising:
- calculating a ratio between measured permeability and predicted permeability for each of the plurality of sampled cores identified as nearest neighbors to the query point or location interval; and
- calculating a distance weighted average permeability at the query point or location interval based upon the measured permeability of each of a plurality of identified nearest neighbors and the calculated ratio between the measured permeability and the predicted permeability of each of the plurality of identified nearest neighbors.

28. An apparatus as defined in claim 25, wherein the plurality of reservoir properties includes porosity, the operations further comprising:
- filtering a database based on a level of a statistical match between measured core porosity and computed log porosity to remove unphysical extreme data to thereby form the reference database, the operation of filtering including:
  - removing collocated log and core data having large porosity discrepancies exceeding a certain level of difference between log and core porosity so that the two respective data types are coherent with each other, and
  - performing a comparison of a permeability histogram for a raw unfiltered form of the reference database with permeability histogram for the filtered form of the reference database to thereby quantify the amount of data removed during the filtering as a quality control measure to ensure that the filtering did not excessively impact the overall permeability distribution; and
- normalizing each of the plurality of properties at each of the plurality of core sample locations in the filtered database.

29. An apparatus as defined in claim 25, wherein the blind test procedure comprises the operations of:
- removing one of the plurality of core samples from a filtered database to thereby create a new database which does not include the removed core sample,
- estimating permeability for the removed core sample according to the deterministic permeability prediction workflow;
- calculating an absolute value of the difference between the estimated permeability and known permeability of the removed core sample;
- repeating the operations of removing of one of the core samples, estimating permeability, and calculating an absolute value for each other of the plurality of core samples from the filtered database, and
- determining an absolute average residual value of a difference between the estimated permeability and known permeability for the plurality of core samples.

30. An apparatus as defined in claim 29, wherein the operation of estimating permeability for the removed course sample for the blind test procedure comprises the operations of:
- determining a distance between the core sample location of the removed core sample and the core sample location of each other of the plurality of core samples in the new database, each respective distance based upon a weighted difference between a well log property value of one of the reservoir properties at the core sample location of the removed core sample and a core sample property value of the one of the plurality of reservoir properties of one of the other of the plurality of core samples, calculated for each separate one of the plurality of reservoir properties;

ranking the plurality of core samples based upon the determined distances;

determining a heuristically optimal number of K nearest neighbors responsive to a sensitivity analysis, or selecting a sufficiently large number of K nearest neighbors when a respective default value is not assigned or to be utilized; and calculating the estimated permeability of the removed core sample based upon a weighted geometric average of the permeability of each identified K-nearest neighbors and corresponding determined distance between the core sample location of the removed core sample and the respective core sample location of each optimal or selected K nearest neighbors.

31. An apparatus as defined in claim 29, wherein the blind test procedure further comprises the operation of:

calculating a ratio between the known permeability and the estimated permeability for the removed sample core.

32. An apparatus as defined in claim 25, wherein the deterministic permeability prediction workflow comprises the operations of:

determining a distance between the query point or location interval and the core sample location of each of the plurality of core samples in the reference database, each respective distance based upon a weighted difference between a well log property value of one of the reservoir properties at the query point or location interval and a sampled core property value of the one of the plurality of reservoir properties of one of the plurality of core samples, calculated for each separate one of the plurality of reservoir properties;

ranking the plurality of core samples based upon the determined distances;

determining a heuristically optimal number of nearest neighbors responsive to a sensitivity analysis or selecting a sufficiently large number of K nearest neighbors; and calculating a distance weighted average permeability at the query point based upon the permeability of the identified number of K nearest neighbors.

33. An apparatus for estimating permeability at unsampled but logged interval locations in a reservoir, the apparatus comprising:

a permeability analyzing computer including a processor and memory coupled to the processor; and permeability analyzing program code adapted to cause the permeability analyzing computer to estimating permeability at unsampled but logged interval locations in a reservoir, the program code stored in the memory of the permeability analyzing computer and including instructions that when executed by the permeability analyzing computer, cause the computer to perform the operations of:

accessing a database comprising one or more databases or lookup tables containing one or more data sets of measured well log values of a plurality of reservoir properties and a corresponding one or more data sets of measured core values of the plurality of reservoir properties for a plurality of core samples extracted from a plurality of core sample locations in a reservoir, the plurality of reservoir properties including porosity;

filtering the database based on a level of a statistical match between measured core porosity and computed log porosity to remove unphysical extreme data to thereby form a reference database, the operation of filtering including:

removing collocated log and core data having large porosity discrepancies exceeding a certain level of difference between log and core porosity so that the two respective data types are coherent with each other, and providing for display of a graphical comparison of a permeability histogram for a raw unfiltered form of the reference database with permeability histogram for the filtered form of the reference database to thereby quantify the amount of data removed during the filtering as a quality control measure to ensure that the filtering did not excessively impact the overall permeability distribution;

normalizing each of the plurality of properties at each of the plurality of core sample locations in the filtered database using an initial value of a normalization parameter;

receiving user selected initial values of weights for each of a plurality of reservoir properties, an initial value of a distance power parameter, and the initial value of a normalization parameter when respective default values are not assigned or to be utilized;

performing an optimization procedure, the optimization procedure comprising:

performing a blind test procedure on the reference database, to include the operations of:

removing one of the plurality of core samples from the filtered database to thereby create a new database which does not include the removed core sample, estimating permeability for the removed core sample according to the deterministic permeability prediction workflow, calculating an absolute value of the difference between the estimated permeability and known permeability of the removed core sample, repeating the operations of removing of one of the core samples, estimating permeability, and calculating an absolute value for each other of the plurality of core samples from the filtered database, and determining an absolute average residual value of a difference between the estimated permeability and known permeability for the plurality of core samples, changing the values of one or more of the weights of the plurality of reservoir properties, the value of the distance power parameter, and the value of the normalization parameter, and repeating the operation of performing the blind test procedure utilizing the changed values and changing the values of one or more or all of the weights of the plurality of reservoir properties, the value of the distance power parameter, and value of the normalization parameter until local minimum of an absolute average residual value is reached to thereby determine optimized values of the weights for the plurality of reservoir properties, an optimized value of the distance power parameter, and an optimized value of the normalization parameter; and performing a deterministic permeability prediction workflow utilizing the optimized values of the weights for the plurality of reservoir properties, the optimized value of the distance power parameter, and the optimized value of the normalization parameter to calculate permeability at a query point or an unsampled but logged interval location encompassing the query point.

34. An apparatus as defined in claim 33, wherein the operation of estimating permeability for the removed course sample for the blind test procedure comprises the operations of:
  determining a distance between the core sample location of the removed core sample and the core sample location of each other of the plurality of core samples in the new database, each respective distance based upon a weighted difference between a well log property value of one of the reservoir properties at the core sample location of the removed core sample and a core sample property value of the one of the plurality of reservoir properties of one of the other of the plurality of core samples, calculated for each separate one of the plurality of reservoir properties,
  ranking the plurality of core samples based upon the determined distances,
  determining a heuristically optimal number of K nearest neighbors responsive to a sensitivity analysis, or selecting a sufficiently large number of K nearest neighbors when a respective default value is not assigned or to be utilized, and
  calculating the estimated permeability of the removed core sample based upon a weighted geometric average of the permeability of each identified K-nearest neighbors and corresponding determined distance between the core sample location of the removed core sample and the respective core sample location of each optimal or selected K nearest neighbors; and
wherein the blind test procedure incorporates the operation of calculating a ratio between the known permeability and the estimated permeability for the removed sample core.

35. An apparatus as defined in claim 33, wherein the deterministic permeability prediction workflow comprises the operations of:
  determining a distance between a query point or location interval and the core sample location of each of the plurality of core samples in the reference database, each respective distance based upon a weighted difference between a well log property value of one of the reservoir properties at the query point or location interval and a sampled core property value of the one of the plurality of reservoir properties of one of the plurality of core samples, calculated for each separate one of the plurality of reservoir properties;
  ranking the plurality of core samples based upon the determined distances;
  determining a heuristically optimal number of K nearest neighbors responsive to a sensitivity analysis or selecting a sufficiently large number of K nearest neighbors; and
  calculating a distance weighted average permeability at the query point based upon the permeability of the identified number of K nearest neighbors.

36. An apparatus as defined in claim 33, wherein the operations further comprise performing a variance correction procedure, comprising:
  calculating a ratio between measured permeability and predicted permeability for each of the plurality of sampled cores identified as nearest neighbors to a query point or location interval; and
  calculating a distance weighted average permeability at the query point or location interval based upon the measured permeability of each of a plurality of identified nearest neighbors and the calculated ratio between the measured permeability and the predicted permeability of each of the plurality of identified nearest neighbors.

* * * * *